United States Patent
Garrels et al.

(10) Patent No.: US 12,134,885 B2
(45) Date of Patent: Nov. 5, 2024

(54) PLUMBING FIXTURE WITH ELECTRO-CHLORINATING DEVICE

(71) Applicant: Kohler Co., Kohler, WI (US)

(72) Inventors: Clayton C. Garrels, Kohler, WI (US); William Kalk, Sheboygan, WI (US); William C. Kuru, Plymouth, WI (US)

(73) Assignee: Kohler Co., Kohler, WI (US)

( * ) Notice: Subject to any disclaimer, the term of this patent is extended or adjusted under 35 U.S.C. 154(b) by 619 days.

(21) Appl. No.: 16/743,096

(22) Filed: Jan. 15, 2020

(65) Prior Publication Data

US 2020/0232200 A1 Jul. 23, 2020

Related U.S. Application Data

(60) Provisional application No. 62/844,285, filed on May 7, 2019, provisional application No. 62/794,753, filed on Jan. 21, 2019.

(51) Int. Cl.
*E03D 9/03* (2006.01)
*C02F 1/461* (2023.01)
*C02F 1/467* (2023.01)

(52) U.S. Cl.
CPC .......... *E03D 9/037* (2013.01); *C02F 1/46109* (2013.01); *C02F 1/4674* (2013.01); *C02F 2303/04* (2013.01)

(58) Field of Classification Search
CPC ........ E03D 9/037; E03D 9/032; E03D 9/033; E03D 2009/028; C02F 1/46109; C02F 1/4674; C02F 2303/04
See application file for complete search history.

(56) References Cited

U.S. PATENT DOCUMENTS

| | | | |
|---|---|---|---|
| 3,774,246 A | 11/1973 | Beer | |
| 3,856,642 A | 12/1974 | Lieb | |
| 3,939,499 A | 2/1976 | Roberts | |
| 4,115,876 A | 9/1978 | Cole, Jr. | |
| 6,319,390 B1 | 11/2001 | Kono et al. | |
| 7,055,183 B2 | 6/2006 | Hoehne et al. | |

(Continued)

FOREIGN PATENT DOCUMENTS

| | | |
|---|---|---|
| CN | 1128980 A | 8/1996 |
| CN | 1811080 A | 8/2006 |

(Continued)

OTHER PUBLICATIONS

Chinese Office Action for Chinese Application No. 202010070725.3 dated Oct. 30, 2020.

*Primary Examiner* — Ciel P Contreras
(74) *Attorney, Agent, or Firm* — Lempia Summerfield Katz LLC

(57) ABSTRACT

An electro-chlorinating device includes a housing and a pair of electrodes. The housing comprises a reservoir; an inlet port fluidly coupled to the reservoir; and a discharge device fluidly coupled to the reservoir. The discharge device is configured to be fluidly coupled to a plumbing product. The discharge device is configured to release a fluid from the reservoir into the plumbing product in response to a movement of water through the plumbing product. The pair of electrodes is coupled to the housing such that at least a portion of each electrode of the pair of electrodes is disposed within the reservoir.

21 Claims, 25 Drawing Sheets

(56) References Cited

U.S. PATENT DOCUMENTS

| | | | |
|---|---|---|---|
| 7,073,209 B1* | 7/2006 | McCormick | E03D 9/033 4/227.1 |
| 8,966,676 B2 | 3/2015 | Hamakita et al. | |
| 9,328,497 B2 | 5/2016 | Morotomi et al. | |
| 9,382,137 B2 | 7/2016 | Jeong | |
| 2006/0076282 A1 | 4/2006 | Hui et al. | |
| 2007/0039087 A1* | 2/2007 | Bringmann | E03D 9/031 4/227.1 |
| 2010/0146693 A1* | 6/2010 | Yamaguchi | E03D 5/10 4/420 |
| 2011/0048964 A1* | 3/2011 | Luebke | C02F 1/4691 205/687 |
| 2012/0131739 A1* | 5/2012 | Burt | E03D 9/037 4/227.7 |
| 2017/0305765 A1* | 10/2017 | Trouve | C02F 1/4604 |
| 2020/0140295 A1* | 5/2020 | Hii | A46B 11/001 |

FOREIGN PATENT DOCUMENTS

| | | |
|---|---|---|
| CN | 101319332 A | 12/2008 |
| CN | 105579402 A | 5/2016 |
| CN | 106801459 A | 6/2017 |
| CN | 206843595 U | 1/2018 |
| JP | 2000064388 A | 2/2000 |
| JP | 2007309089 A | 11/2007 |

* cited by examiner

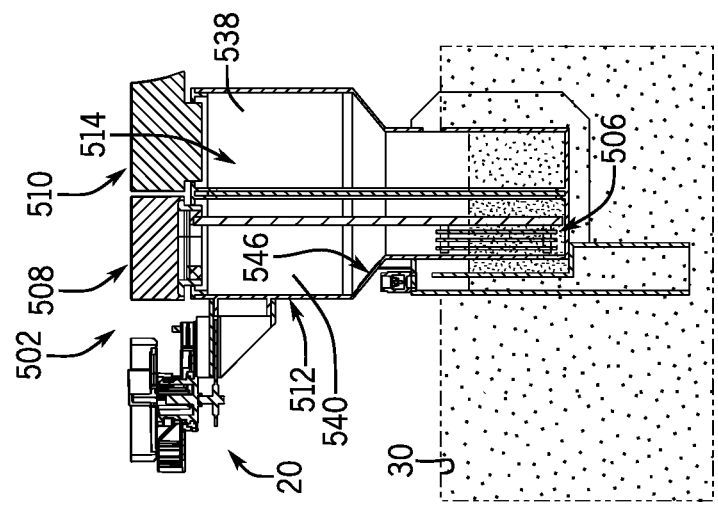
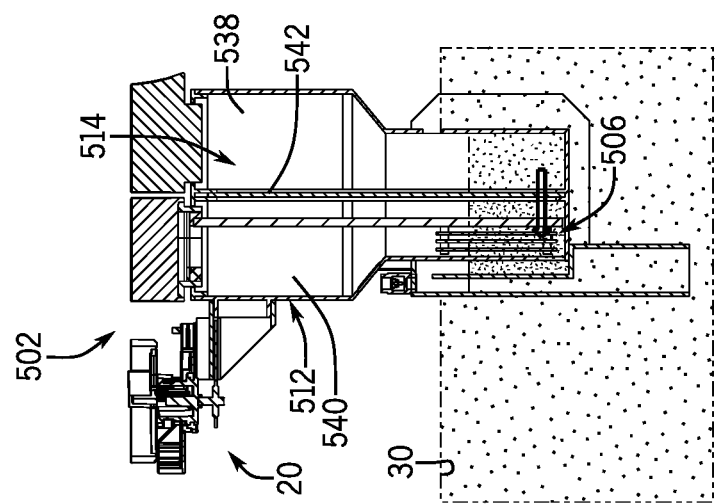
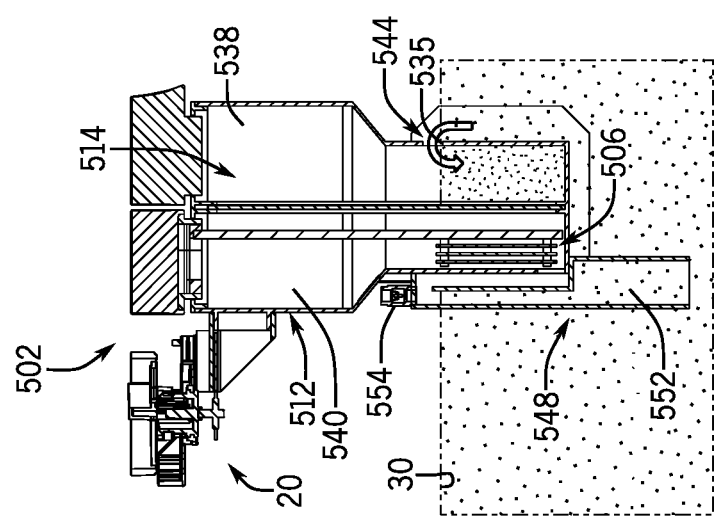

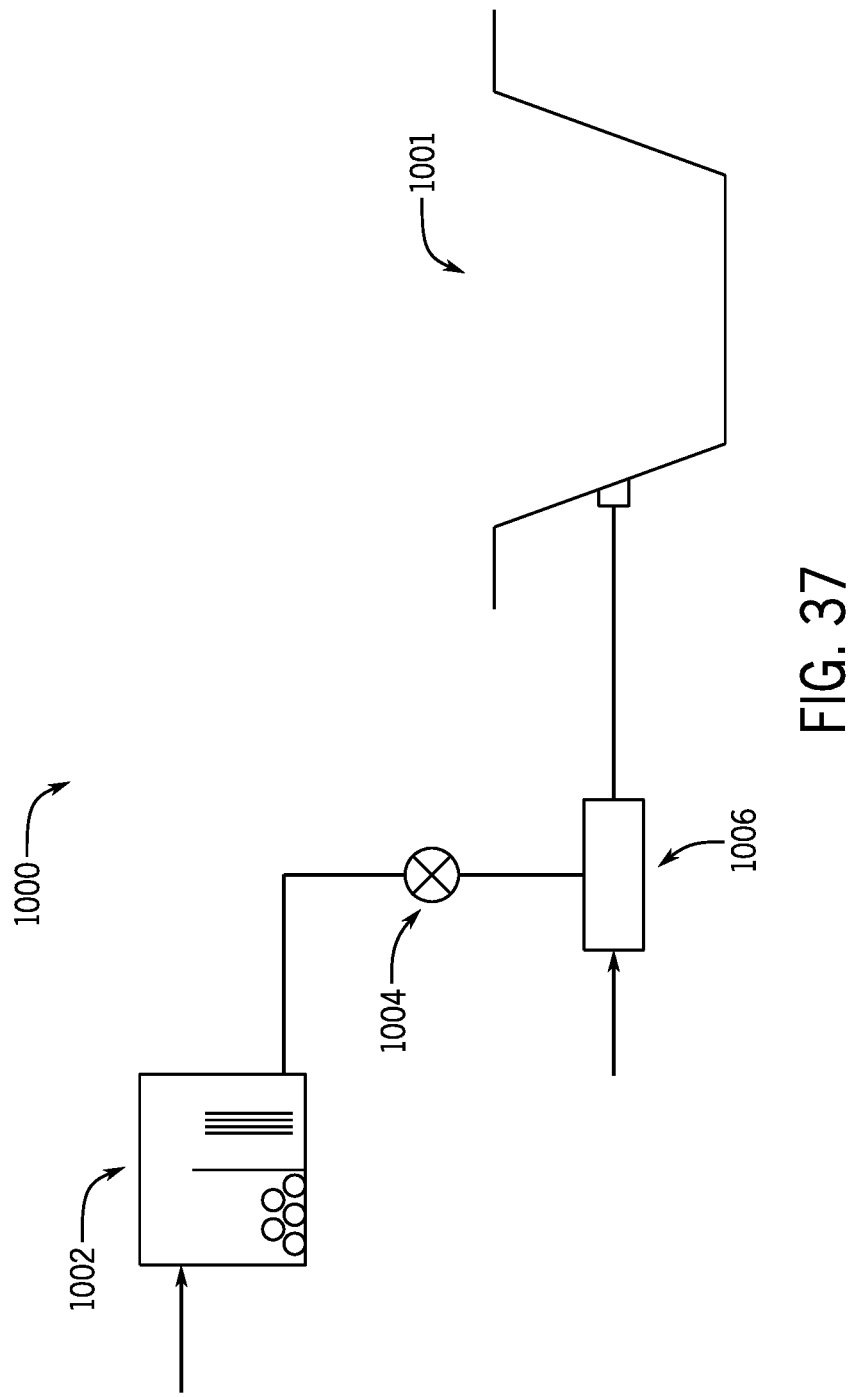

PLUMBING FIXTURE WITH ELECTRO-CHLORINATING DEVICE

CROSS-REFERENCE TO RELATED PATENT APPLICATIONS

This application claims the benefit of and priority to U.S. Provisional Patent Application No. 62/844,285, filed May 7, 2019, and U.S. Provisional Patent Application No. 62/794,753, filed Jan. 21, 2019. The entire disclosure of each of these patent application is incorporated by reference herein.

BACKGROUND

The present application relates generally to systems and methods used to facilitate cleaning of plumbing products such as a toilet, sink, or bath tub. More specifically, the present disclosure relates to a system configured to generate a cleaning solution and dispense the solution into the water and onto surfaces of the plumbing product.

SUMMARY

At least one exemplary embodiment relates to an electro-chlorinating device. The electro-chlorinating device includes a housing and a pair of electrodes. The housing comprises a reservoir; an inlet port fluidly coupled to the reservoir; and a discharge device fluidly coupled to the reservoir. The discharge device is configured to be fluidly coupled to a plumbing product. The discharge device is configured to release a fluid from the reservoir into the plumbing product in response to a movement of water through the plumbing product. The pair of electrodes is coupled to the housing such that at least a portion of each electrode of the pair of electrodes is disposed within the reservoir.

Another exemplary embodiment relates to a system including a toilet, and an electro-chlorinating device. The toilet includes a bowl and a flush tank that is fluidly coupled to the bowl. The electro-chlorinating device includes a housing and a pair of electrodes. The housing is coupled to the flush tank and is disposed at least partially within the flush tank. The housing includes a reservoir, an inlet port, and a discharge device. The inlet port is fluidly coupled to the reservoir. The discharge device is fluidly coupled to the reservoir and the flush tank. The pair of electrodes is coupled to the housing such that at least a portion of each electrode of the pair of electrodes is disposed within the reservoir.

Another exemplary embodiment relates to a method. The method includes providing a toilet, providing a housing, and providing a pair of electrodes. The toilet includes a bowl and a flush tank fluidly coupled to the bowl. The housing includes a reservoir, an inlet port fluidly coupled to the reservoir, and a discharge device that is fluidly coupled to the reservoir and the flush tank. The method additionally includes mounting the housing in the flush tank of the toilet.

BRIEF DESCRIPTION OF THE FIGURES

FIGS. 28-32 schematically illustrate the method of FIG. 27, according to an exemplary embodiment.

FIG. 37 is a schematic of a cleaning system for a whirlpool bath, according to an exemplary embodiment.

DETAILED DESCRIPTION

Figure 1:
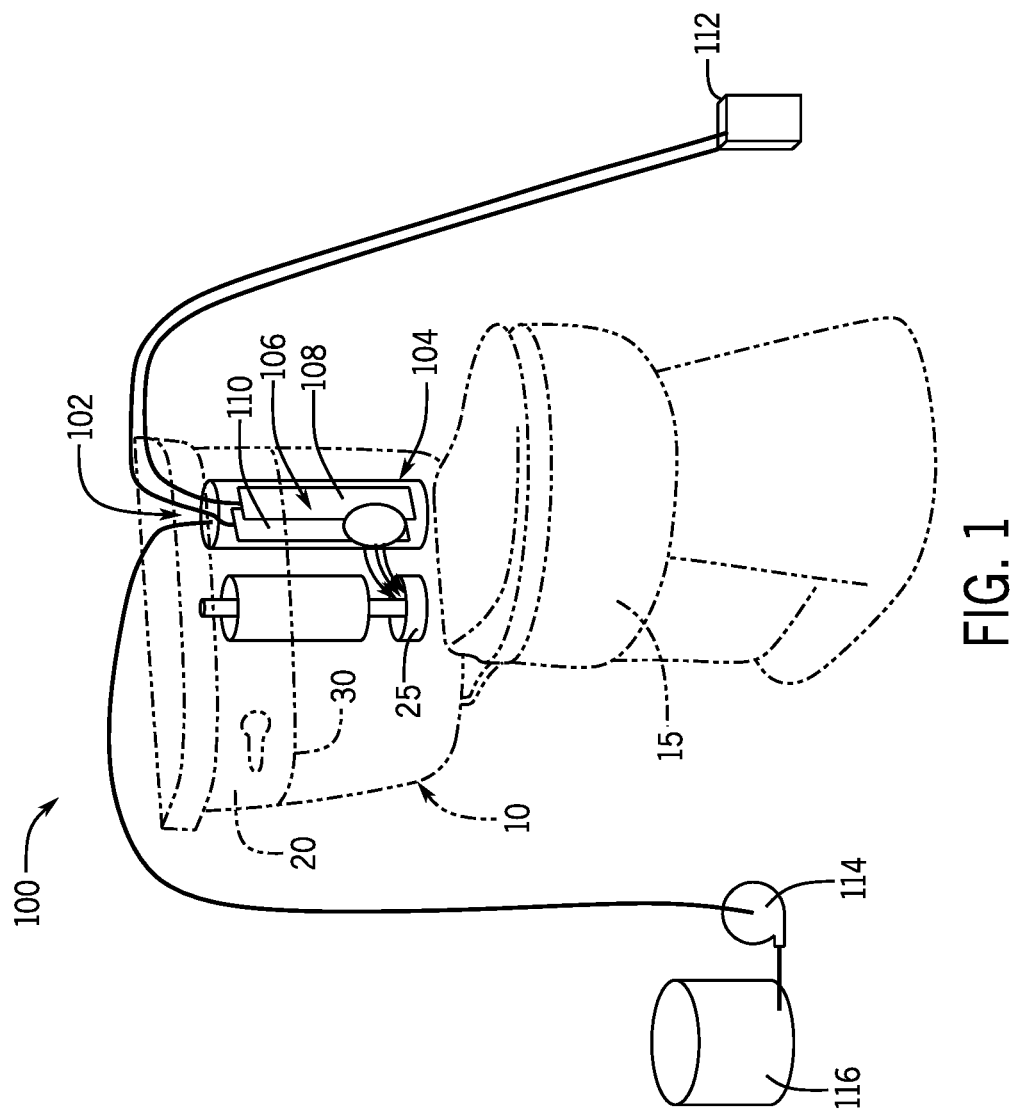
FIG. 1 is a perspective view of a toilet cleaning system, according to an exemplary embodiment.

A variety of products exist for cleaning plumbing products. For example, products for cleaning a toilet include chemical toilet bowl cleaning products, solid chemical cleaning pucks, and chemical tablets. These products are applied by a user directly to the surfaces of a toilet bowl, or placed by the user into a flush tank or under the rim of the toilet, where they may slowly dissolve into the flush water. These products traditionally utilize aggressive chemicals to remove hard water deposits and other difficult to remove surface stains. The user must interact with these chemicals when applying them to the toilet, by manually placing chemical-based pucks into the flush tank, or by dispensing the chemicals from plastic containers directly onto the surfaces of the toilet bowl. This interaction poses health and safety risks for the user. Additionally, these chemicals may be harmful to the environment and/or septic systems into which they are released.

It would be advantageous to provide an improved system for introducing cleaning agents into a toilet that addresses the aforementioned issues.

Referring generally to the figures, a cleaning system includes an electro-chlorinating device configured to generate a cleaning solution (e.g., a chlorinated solution) from water supplied to a plumbing fixture. The electro-chlorinating device is a self-contained unit. The electro-chlorinating device is configured to generate the cleaning solution though the process of electrolysis. The electro-chlorinating device is configured to utilize the movement of water through a plumbing product (e.g., the movement of water through a flush valve of a toilet, the movement of water through a jet of a whirlpool, the movement of water through a hand sprayer, etc.) to facilitate the release of the cleaning product, which can, advantageously, minimize exposure of the cleaning solution to delicate components within the plumbing product and/or improve distribution of the cleaning solution.

According to an exemplary embodiment, the electro-chlorinating device includes a housing defining a reservoir, an inlet port, and a discharge device that includes at least one of a siphon and a venturi. Both the inlet port and the siphon/venturi are fluidly coupled to the reservoir. The reservoir may be subdivided into two portions: a first portion configured to receive a salt (e.g., common table salt, i.e., sodium chloride), and a second portion configured to receive a pair of electrodes. The inlet port may be configured to receive water from a water supply conduit that is connected (e.g., fluidly coupled) to a water supply line, such as a normal household supply line that supplies water at a pressure of about 30 psi. In some embodiments, the water supply line may be a water supply line inside a commercial property or another type of building. The water supply conduit may be a pipe, tube, or other water delivery mechanism extending from the water supply line. The water passing through the inlet port flows through the first portion and mixes with the salt to form a brine. The brine flows through a small gap (e.g., hole or opening) in a wall (e.g., partition) between the first portion and the second portion. In other embodiments, the brine may flow through a permeable barrier used to separate the first portion from the second portion. The permeable barrier may be configured to prevent any solids from passing into the second portion.

Within the second portion, the brine enters a small gap formed between one or more pairs of electrodes. When activated, the electrodes are configured to transmit an electric current through the brine, triggering electrolysis and the generation of a cleaning solution (e.g., a chlorinated solution, hypochlorite, bleach, etc.). Any excess hydrogen and/or other gaseous products may be vented through an exhaust port of the housing so as to prevent the buildup of gas, and to prevent the housing from becoming over-pressurized. Among other benefits, the system eliminates the need for the user to interact with any caustic chemicals in order to clean the plumbing product. The only maintenance required for the cleaning system is regular replenishment of the salt, which is non-toxic and relatively inexpensive. Additionally, because the system generates the chlorinated solution in-situ, there are no residual chemicals that are flushed down the drain of the plumbing product (e.g., scents, binders, and other hazardous chemicals).

According to an exemplary embodiment, the plumbing product is a toilet and the electro-chlorinating device includes a siphon configured to coordinate removal of the chlorinated solution from the housing with a flush event. The siphon may include an inverted U-shaped channel. A first leg of the channel may be configured to receive the chlorinated solution from second portion of the housing. A second leg of the channel may be configured to receive water from a flush tank of the toilet or from a fill valve within the flush tank. During a flush event (e.g., when the toilet is flushed, when a flush valve in the flush tank is opened, etc.), water leaving through the second leg draws the chlorinated solution out through the siphon and directly into the flush valve. Among other benefits, the siphon allows for a controlled release of chlorinated solution with each flush event as opposed to chemical-based pucks or tablets, which continuously release chemicals into the water in the flush tank once submerged. Additionally, by generation of chemistry in-situ, only the required amount of chemistry is used in each flush—resulting in a more favorable environmental impact. These and other advantageous features will become apparent to those reviewing the present disclosure and figures.

Referring to FIG. 1, a toilet cleaning system 100 that includes an electro-chlorinating device 102 is shown as being configured for use with a toilet 10, according to an exemplary embodiment. It should be understood that at least some of the components of the toilet cleaning system may be provided within the toilet (e.g., within the tank) according to various exemplary embodiments, even though FIG. 1 shows them as being external to the toilet for illustrative purposes.

As shown in FIG. 1, the toilet 10 is configured as a tank-type or gravity flush toilet, which utilizes gravity to facilitate the removal of waste from the toilet 10. In other embodiments, the toilet 10 may be configured as a tankless toilet or a toilet that uses water pressure from a water supply line (e.g., household water pressure) to drive the flushing process. As shown in FIG. 1, the toilet 10 includes a toilet bowl 15 and a flush tank 20 coupled to the toilet bowl 15. Alternatively, the flush tank 20 may be located remotely from the toilet bowl 15.

The toilet bowl 15 may include an inner surface defining a cavity (not shown). The cavity may be configured to receive both solid and liquid waste. According to another exemplary embodiment, the toilet cleaning system 100 as described herein may be configured to work with a urinal that is configured to receive only liquid waste.

According to an exemplary embodiment, the cavity is fluidly coupled to the flush tank 20. During a flush event, water is discharged from the flush tank 20 by gravity through a flush valve 25 (e.g., a lower valve, a canister valve) that is located in the flush tank 20, and into the toilet bowl 15. The water may be distributed onto the surfaces of the toilet bowl 15 through nozzles along an upper rim surrounding the toilet bowl 15, or through another nozzle or water dispensing mechanism. The water is used to remove debris from the surfaces of the toilet bowl 15 and to help eject the waste from the toilet bowl 15 through a trap way into a drain line (e.g., a household waste line, a sewer line, etc.). Near the conclusion of the flush event, the flush valve 25 in the flush tank 20 closes and the flush tank is refilled in preparation for future use.

The electro-chlorinating device 102 is configured to generate a cleaning solution (e.g., a chlorinated solution) through the process of electrolysis. The electro-chlorinating device 102 includes a housing 104 (e.g., an insert, a reservoir, etc.) that is coupled to the flush tank 20 and is disposed at least partially below a water-line 30 of the flush tank 20 (e.g., a level at which a fill valve or other metering valve is configured to stop the flow of water into the flush tank 20). The housing 104 defines a hollow portion configured to receive a pair of electrodes 106, including first electrode 108 and second electrode 110. The first electrode 108 is oriented substantially parallel to the second electrode 110 and is spaced apart from the first electrode 108 to form a gap. The first electrode 108 may be a cathode and the second electrode 110 may be an anode. Alternatively, the first electrode 108 may be the anode and the second electrode 110 may be the cathode. As shown in FIG. 1, each of the electrodes 108, 110 is operably coupled to a power supply 112. In some embodiments, the power supply 112 may be an inverter configured to provide direct current (DC) to the electrodes from a household power line. Alternatively, the power supply 112 may include a battery to eliminate the need for a power outlet, or to provide backup power in case of a power outage.

As shown in FIG. 1, the electro-chlorinating device 102 further includes a pump 114 and a salt tank 116 (e.g., canister, reservoir, container, etc.), both of which are fluidly coupled to the housing 104. According to an exemplary embodiment, the salt tank 116 is integrally formed with the housing 104 as a second portion of the housing 104, thereby eliminating the need for the pump 114. The salt tank 116 may be configured to receive a salt-water solution (e.g., brine, etc.). Alternatively, the salt tank 116 may include salt in solid form (e.g. pellets, granules, etc.), or salt immersed in water. The salt may be manually placed or deposited by a user into the salt tank 116. As shown in FIG. 1, the pump 114 is configured to transfer salt or brine from the salt tank 116 to the housing 104.

According to an exemplary embodiment, activating the power supply 112 causes a current to flow through the brine in gaps between pairs of adjacent electrodes 108, 110. The current triggers a chemical reaction in which the brine is converted into a cleaning solution (e.g., a chlorinated solution). The products of the reaction include sodium hypochlorite (e.g., bleach), which may be used as a cleaning agent to disinfect and maintain the appearance of the surface of the toilet bowl. The products also include hydrogen gas, a byproduct of the chemical reaction. The amount of the chlorinated solution generated is a function of the current supplied to the electrodes 108, 110, the salinity of the water in the gap, and the surface area of the electrodes 108, 110 in contact with the brine. The advantages associated with the chemical reaction (e.g., in-situ electro-chlorination) are numerous and include the ability to control the quantity of cleaning solution produced, and the elimination of other hazardous chemicals typically included with conventional cleaning fluids and products.

According to an exemplary embodiment, the electro-chlorinating device 102 is configured to mix the chlorinated solution with the water in the flush tank 20 at the entrance to the flush valve 25, which, advantageously, prevents residual chemicals from entering the flush tank 20 from the housing 104. In some embodiments, the housing 104 includes a water permeable membrane (e.g., a filter, a perforated outer wall, etc.) configured to prevent large salt particles or other solids from being ejected from the housing 104 and into the water leaving the flush tank 20. Chemical exiting the flush tank 20 through the flush valve 25 is released into the toilet bowl 15, and onto the surfaces of the toilet bowl 15, during every flush cycle. Among other benefits, coordinating the release of the cleaning solution with the flush cycle helps to prevent bacterial growth and staining that would otherwise occur during periods of non-use.

Figure 2:
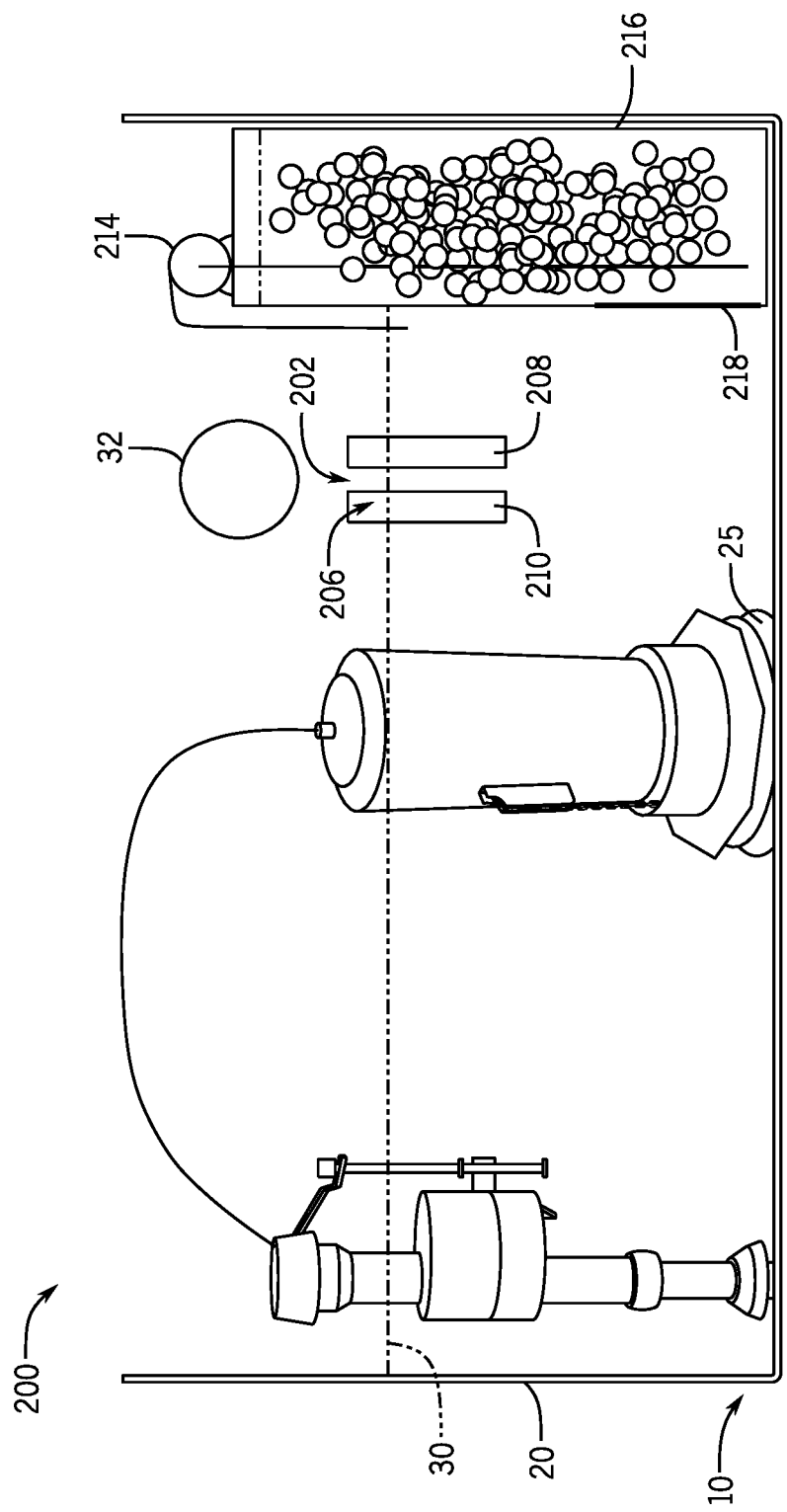
FIG. 2 is a front sectional view of a flush tank including an electro-chlorinating device, according to an exemplary embodiment.

Various embodiments of the toilet cleaning system 100 are contemplated. For example, FIG. 2 shows a toilet cleaning system 200 having an electro-chlorinating device 202 that is contained entirely within the flush tank 20. As shown in FIG. 2, rather than being positioned remotely from the flush tank 20, the salt tank 216 is at least partially disposed beneath the water-line 30 of the flush tank 20. The salt tank 216 may be configured to receive salt in granular form (e.g., pellets, crystals, etc.). Alternatively, the salt may be provided to the salt tank 216 as a solid cylinder or in another convenient form. As shown in FIG. 2, the salt tank 216 includes a water permeable membrane 218 configured to allow water from the flush tank 20 to mix freely with the salt. The membrane 218 may be the same or different from the membrane described with reference to FIG. 1.

According to an exemplary embodiment, electro-chlorinating device 202 includes a pump 214 configured to collect brine from the salt tank 216 and dispense the brine through a flow conduit into the flush tank 20. In alternative embodiments, the brine may be allowed to diffuse through the membrane, in which case the electrodes 208, 210 may be positioned adjacent to (e.g., close to, etc.) the membrane so as to maximize the amount of reactant (e.g., salt) in the gap between the electrodes 208, 210. The electro-chlorinating device 202 may be configured may be configured to continuously circulate water or brine back into the flush tank 20 via the pump 214. Alternatively, the electro-chlorinating device 202 may include a control system that controls the pump 214 so as to coordinate the release of brine with user activities (e.g., after a flush event, etc.).

As shown in FIG. 2, the electro-chlorinating device 202 includes a pair of electrodes 206, including first electrode 208 and second electrode 210. Unlike the electrodes 108, 110 described with reference FIG. 1, the electrodes 208, 210 of FIG. 2 are disposed directly in the flush tank 20, rather than in an insert, housing, or enclosure. As shown in FIG. 2, the flush tank 20 includes an opening 32 through which hydrogen gas and any other gaseous chemical byproducts may be vented from the flush tank 20, thereby preventing the buildup of gas and over pressurization of the flush tank 20.

Figure 3:
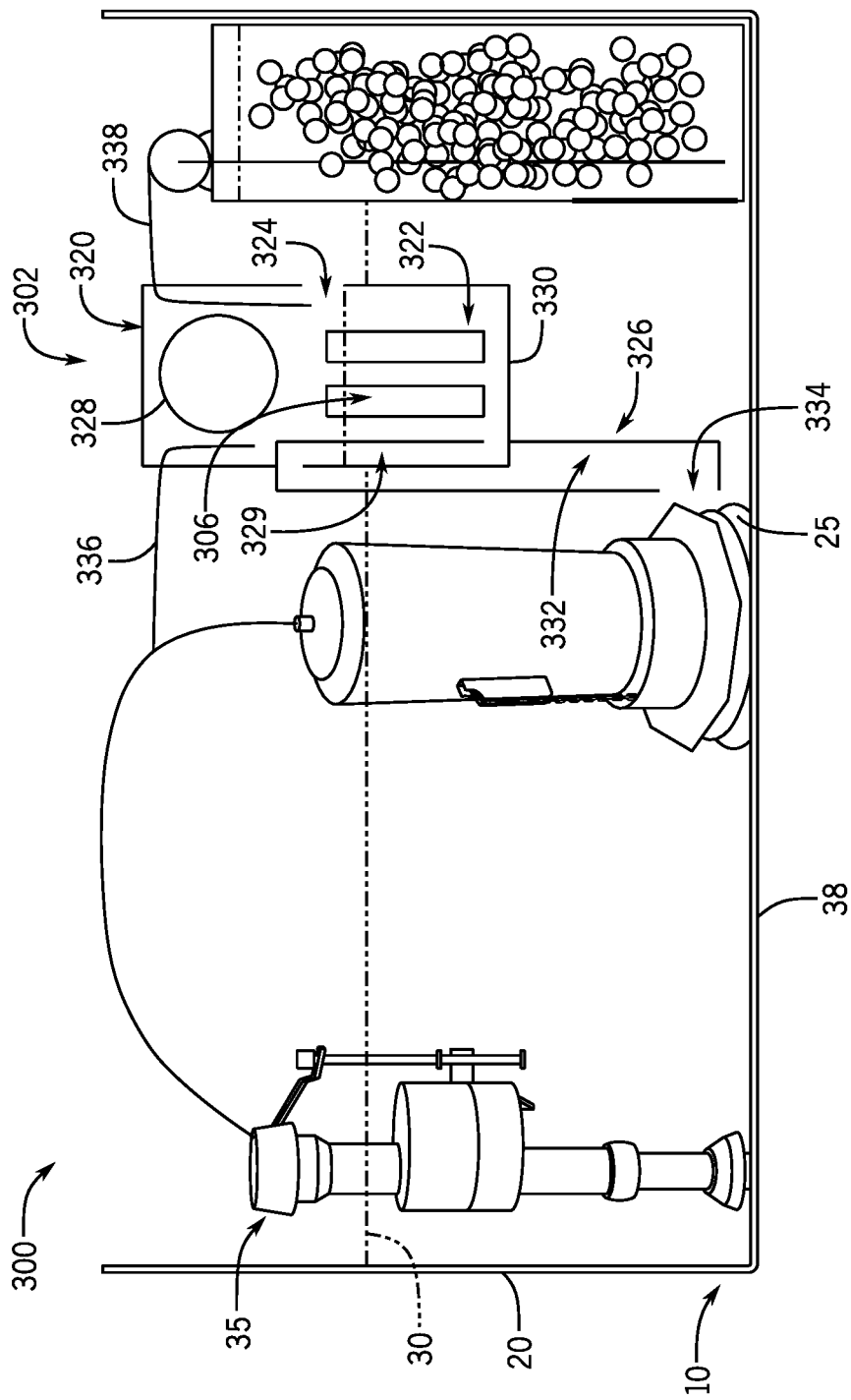
FIG. 3 is a front sectional view of a flush tank including an electro-chlorinating device, according to another exemplary embodiment.

FIG. 3 shows a toilet cleaning system 300 that is configured to coordinate the release of the chlorinated solution with a flush event, according to an exemplary embodiment. As shown in FIG. 3, an electro-chlorinating device 302 for the toilet cleaning system 300 includes a housing 320 disposed in the flush tank 20. The housing 320 is at least partially submerged beneath the water-line 30 of the flush tank 20. The housing 320 defines a reservoir 322, an overflow port 324, and a siphon 326 (e.g., a discharge device, etc.). According to an exemplary embodiment, both the overflow port 324 and the siphon 326 are fluidly coupled to the reservoir 322. As shown in FIG. 3, the overflow port 324 is disposed in a side of the housing 320, a distance above the water-line 30 of the flush tank 20. The overflow port 324 may be a small hole or opening in the side of the flush tank 20. Alternatively, the overflow port 324 may include a check valve disposed in a side wall or upper wall of the housing 320.

According to an exemplary embodiment, the siphon 326 is configured to coordinate the release of the chlorinated solution, from the reservoir 322 into the flush tank 20, with a flush event. As shown in FIG. 3, the siphon 326 includes an inverted U-shaped channel having two legs, a first leg 329 disposed in the reservoir 322 and extending along a side of the housing 320 toward a lower wall 330 of the housing 320, and a second leg 332 disposed on an outer surface of the housing 320 and extending beyond the lower wall 330 of the housing 320 and toward a bottom wall 38 of the flush tank 20. Water from the flush tank 20 may enter and leave the second leg 332 through a release port 334 disposed proximate to a lower end of the second leg 332. Water from the reservoir 322 may enter and leave the first leg 329 through an intake port at the bottom of the first leg 329. As the water level rises in the flush tank 20, water enters the second leg 332 through the release port 334, which is filled to a level approximately equal to the water-line 30 in the flush tank 20. When the toilet 10 is flushed (e.g., when the valve 25 disposed on the bottom wall 38 of the flush tank 20 is opened, etc.), water drains from the flush tank 20, which allows water from the second leg 332 to discharge back into the flush tank 20. Water leaving the siphon 326 through the second leg 332 draws fluid (e.g., cleaning solution) up through the first leg 329 and into the second leg 332, triggering a siphon effect. The flow of water through the siphon 326 continues until the level of water or cleaning solution in the reservoir 322 drops below the intake port.

As shown in FIG. 3, the reservoir 322 is configured to receive a pair of electrodes 306. The pair of electrodes 306 extend upward from a lower portion of the reservoir 322 to a location just above a lower edge of the overflow port 324 (e.g., above a water-line of the reservoir 322, etc.). The electrical connections for the pair of electrodes 306 may be disposed proximate to an upper end (e.g., a dry end) of the pair of electrodes 306 or otherwise insulated from the water in the reservoir 322 so as to prevent an electrical short.

As shown in FIG. 3, the electro-chlorinating device 302 includes a water conduit 336 and a brine conduit 338, both of which extend through a wall of the housing 320. In the embodiment of FIG. 3, the water conduit 336 is fluidly coupled to a fill valve 35 for the flush tank 20 which may, advantageously, coordinate filling of the reservoir 322 with the flush tank 20. In other embodiments, the electro-chlorinating device 302 may include a control valve coupled to the water conduit 336 and configured to regulate the flow of water from the fill valve 35 to the reservoir 322. In some embodiments, the water conduit 336 may be directly coupled to a water supply line (e.g., a household water supply line, etc.) rather than the fill valve 35 such that the reservoir 322 may be filled independently from the flush tank 20. In the embodiment of FIG. 3, the brine conduit 338 is coupled to a salt tank 316 via a pump 314, which may be the same or substantially similar to the salt tank 216 and the pump 214 described with reference to FIG. 2.

As shown in FIG. 3, the housing 320 also defines an exhaust opening 328 fluidly coupled to the opening 32 of the flush tank 20. In the embodiment of FIG. 3, the exhaust opening 328 is disposed along a side wall of the housing 320 proximate to an upper wall of the housing 320. In other embodiments, the exhaust opening 328 may be disposed along the upper wall of the housing 320. The exhaust opening 328 is configured to allow hydrogen and other gaseous chemical byproducts to be vented directly from the housing 320, which, advantageously, reduces the risk of over pressurizing the housing 320 and associated buildup of gas.

Figure 4:
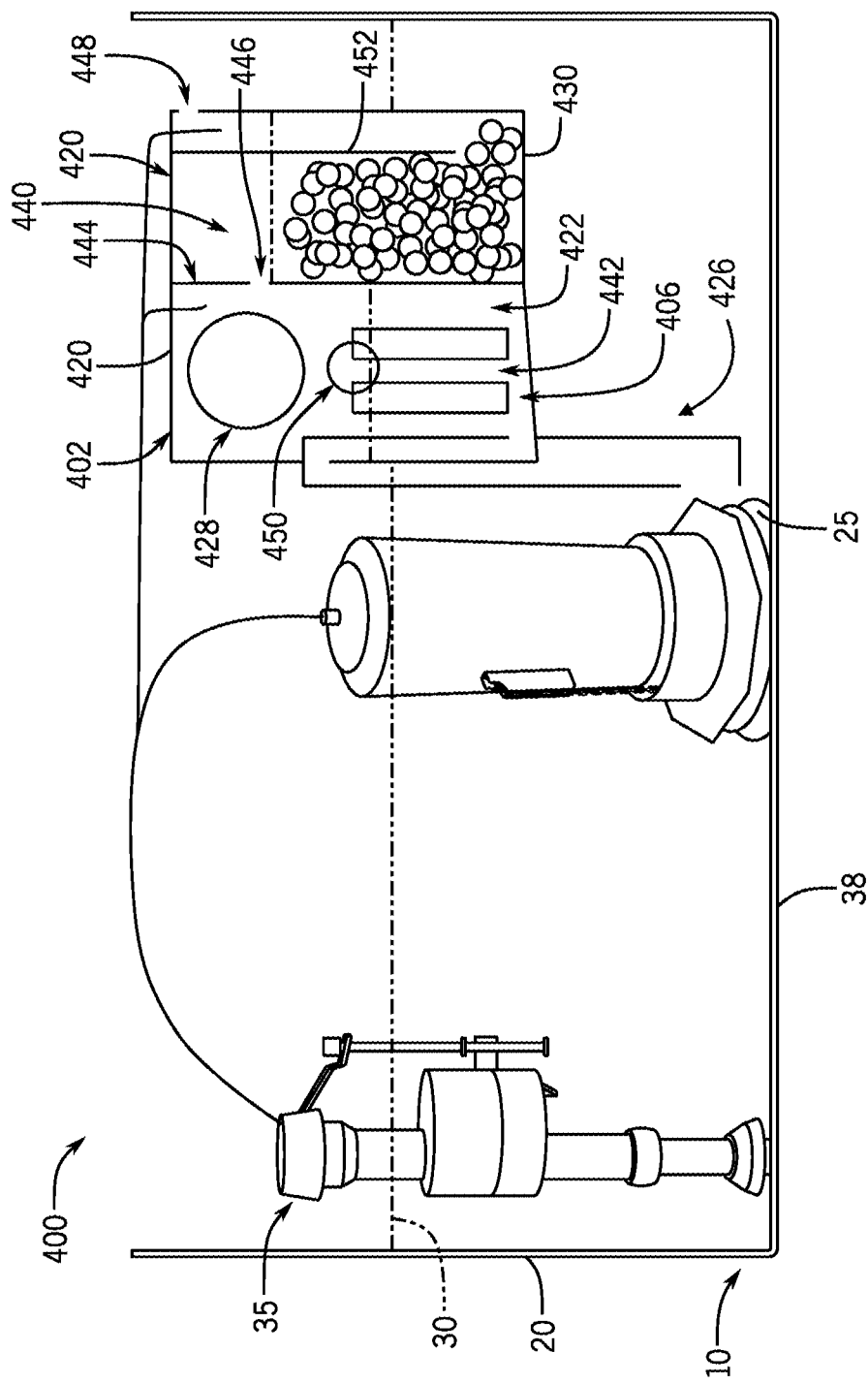
FIG. 4 is a front sectional view of a flush tank including an electro-chlorinating device, according to another exemplary embodiment.

FIG. 4 shows another exemplary embodiment of a housing 420 of an electro-chlorinating device 400. Similar to the housing 320 described with reference to FIG. 3, the housing 420 of FIG. 4 (e.g., an outer wall of the housing 420) defines a reservoir 422 and a siphon 426 (e.g., a discharge device, etc.). As shown in FIG. 4, the reservoir 422 is subdivided into two portions, a first portion 440 configured to receive salt, and a second portion 442 configured to receive a pair of electrodes 406. The first portion 440 and the second portion 442 are separated by a partition 444. As shown in FIG. 4, the partition 444 includes a substantially vertical wall extending between a lower wall 430 and an upper wall 402 of the housing 420. In the embodiment of FIG. 4, the partition 444 defines a fill port 446 through which water, brine, or another chemical solution from the first portion 440 may enter the second portion 442. The housing 420 additionally defines a plurality of overflow ports. A first overflow port 448 is disposed in the first portion 440 of the reservoir 422. As shown in FIG. 4, the first overflow port 448 is disposed proximate to the upper wall 402 of the housing 420. The second overflow port 450 is disposed in the second portion 442 of the reservoir 422, at a location that is below (e.g., vertically below as shown in FIG. 4) the first overflow port 448. As shown in FIG. 4, the fill port 446 is disposed between the overflow ports 448 and 450 (e.g., at a location that is vertically between the overflow port 448 and 450). Among other benefits, the relative positioning of ports prevents flow reversal of the cleaning solution during normal operation (e.g., from the second portion 442 back into the first portion 440, etc.).

As shown in FIG. 4, the housing 420 further includes a second partition 452 disposed in the second portion 442 and coupled to the upper wall of the housing 420. The second partition 452 prevents the salt from being inadvertently discharged into the flush tank 20 (e.g., through the overflow port 448). The housing 420 also defines an exhaust opening 428, which is disposed proximate to the upper wall in the first portion 440 of the housing 420. In the embodiment of FIG. 4, water is provided to each portion 440 and 442 of the reservoir 422 through two water conduits that branch off from the fill valve 35 of the flush tank 20. As with the water conduit 336 described with reference to FIG. 3, the flow of water through either of the water conduits of FIG. 4 may be controlled using one or more flow control valves or another flow control mechanism known to those of ordinary skill in the art.

The electro-chlorinating devices 302 and 400 of FIGS. 3-4 are self-contained units, separate from the flush tank 20. The electro-chlorinating devices 302 and 400 are configured to separate the chlorinated solution from the flush tank 20 in between flushes, which can, advantageously, minimize damage to components that might otherwise result from prolonged exposure of the cleaning solution to the flush tank trim (e.g., valves, actuators, and other components of the flush tank 20). Furthermore, the salinity in the gap between the electrodes (e.g., within the reservoir 322 of FIG. 3 or within the first portion 440 of the reservoir 422 of FIG. 4) can be more accurately controlled as compared to a system where the electrodes are disposed within the flush tank 20 directly.

Figure 6:
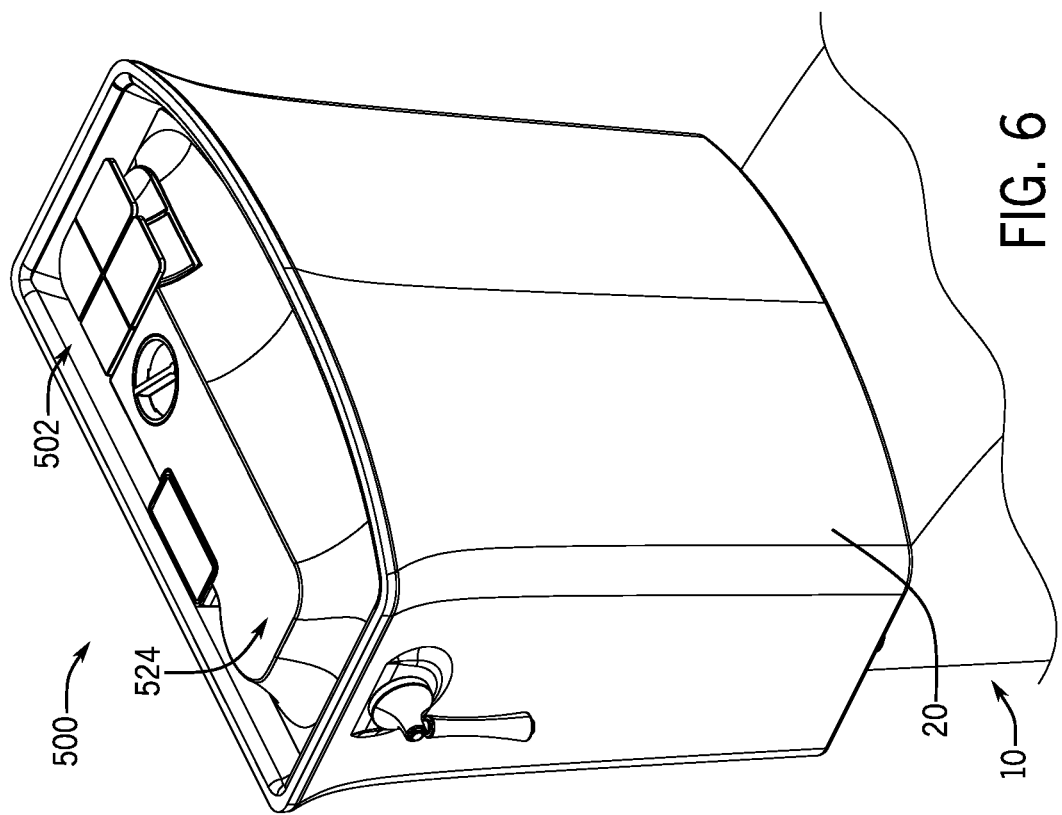
FIG. 6 is another front perspective view of the toilet cleaning system of FIG. 5.
Figure 5:
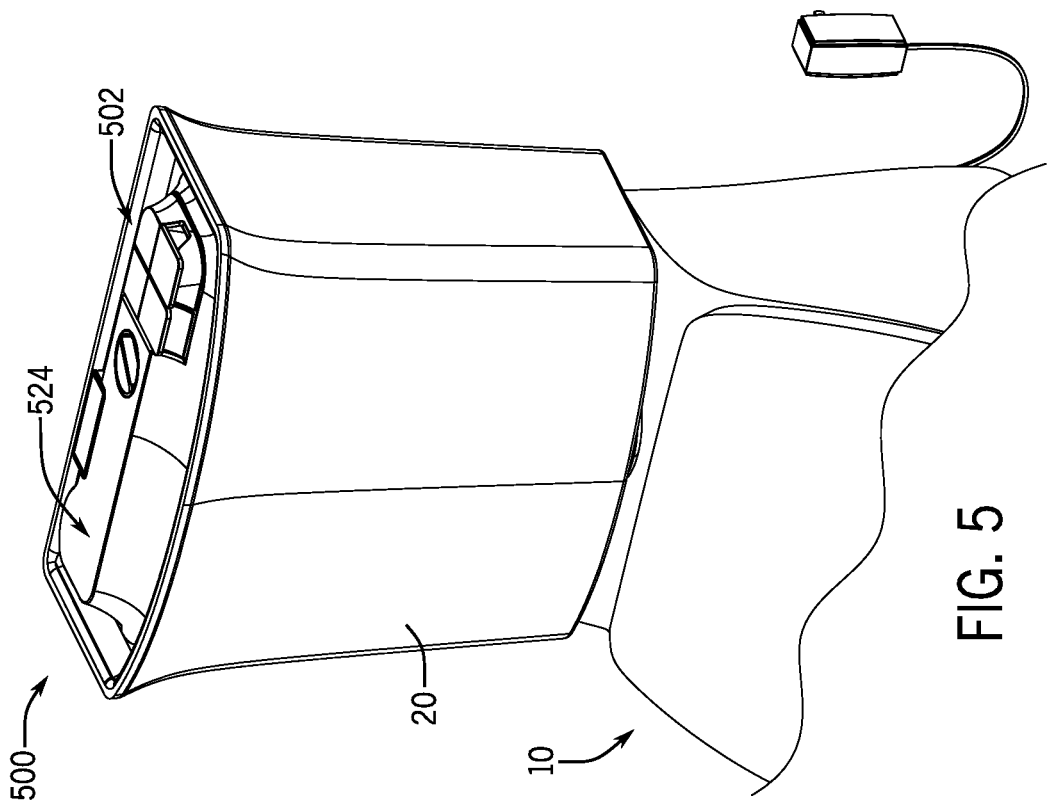
FIG. 5 is a front perspective view of a toilet cleaning system, according to an exemplary embodiment.

FIGS. 5-14 show perspective views of a toilet cleaning system 500, according to another exemplary embodiment. As shown in FIGS. 5-6, the toilet cleaning system 500 includes an electro-chlorinating device 502 that fits substantially (e.g., entirely) within the flush tank 20. Although not shown, a cover (e.g., trim piece) for the flush tank 20 may be included with the flush tank 20 (e.g., removably coupled to the flush tank 20, etc.) to prevent a user from accessing the electro-chlorinating device 502 during regular use. FIG. 5 also shows an electrical connector (e.g., wall plug or connector) for the electro-chlorinating device 502 used to power the device 502.

Figure 7:
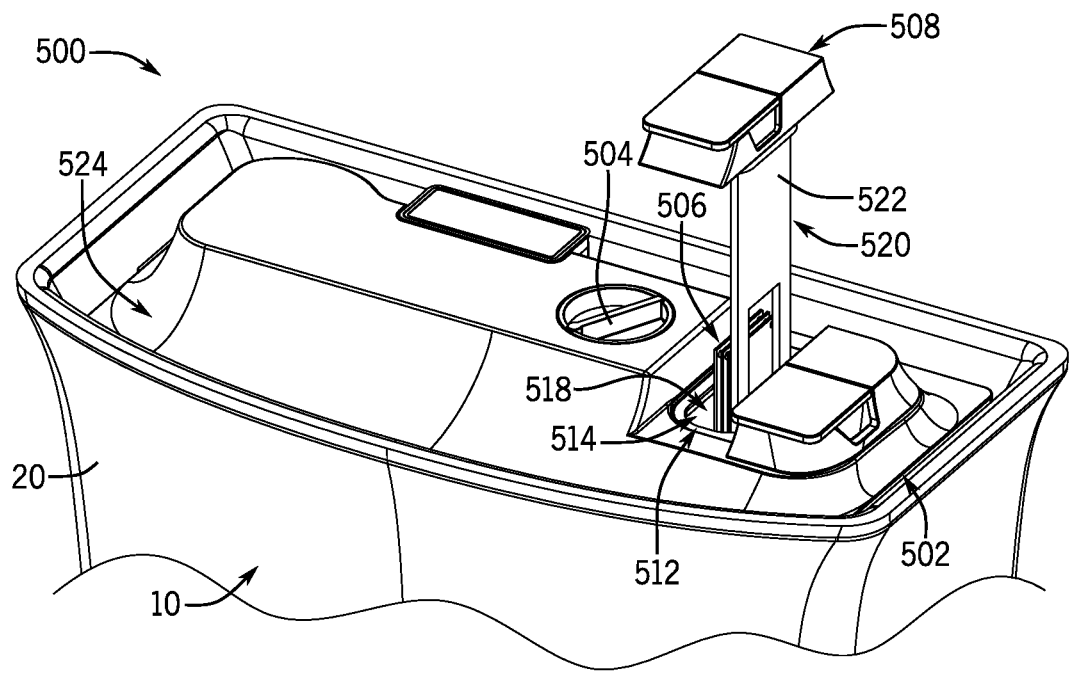
FIG. 7 is a front perspective view of the toilet cleaning system of FIG. 1 showing a removable electrode cartridge of an electro-chlorinating device, according to an exemplary embodiment.
Figure 8:
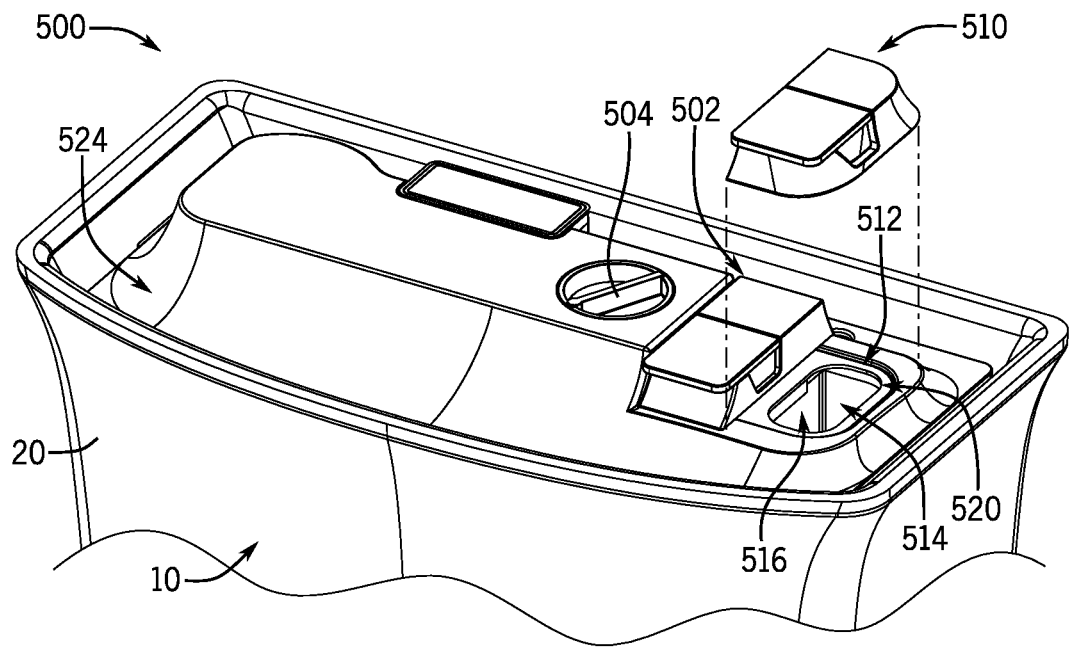
FIG. 8 is a front perspective view of the toilet cleaning device of FIG. 1 showing a removable fill cap of an electro-chlorinating device, according to an exemplary embodiment.

FIGS. 7-8 show a front perspective view of the toilet cleaning system 500 of FIG. 5. As shown in FIGS. 7-8, the electro-chlorinating device 502 includes a rheostat 504 configured to control the voltage to a set of electrodes 506. Operation of the rheostat 504 and/or other methods of dose concentration and control will be described in more detail with reference to FIGS. 12-14.

As shown in FIGS. 7-8, the electro-chlorinating device 502 also includes a plurality of service access caps, shown as first access cap 508 and second access cap 510. As shown in FIGS. 7-8, each access cap 508, 510 is removably coupled to a housing 512 of the electro-chlorinating device 502. The access caps 508, 510 are configured to provide access to a portion of a reservoir 514 within the housing 512. As shown in FIG. 7, a second portion 518 of the reservoir 514 may be accessed through the first access cap 508, while a first portion 516 of the reservoir 514 may be accessed through the second access cap 510. The access caps 508, 510 may include O-rings or seals that interface with the housing 512 to prevent water, brine, or the chlorinated solution from escaping through the access caps 508, 510. In some embodiments, the access caps 508, 510 may include an exhaust vent to facilitate the removal of hydrogen and other gaseous byproducts from the housing 512.

According to an exemplary embodiment, each of the access caps 508, 510 includes a quick-release cover 509, 511 that may be reoriented to provide access to the reservoir 514. As shown in FIG. 7, the first access cap 508 is coupled to a removable electrode cartridge 520 configured to provide quick and easy access to the set of electrodes 506. The electrode cartridge 520 includes a support member 522 to which the set of electrodes 506 are detachably coupled (e.g., mounted, etc.). In the embodiment of FIG. 7, the set of electrodes 506 includes three electrodes, although more or fewer electrodes may be included in alternative embodiments. As shown in FIG. 7, the electrodes are configured as rectangular plates oriented substantially parallel to one another so as to form a gap between each pair of electrodes. In other embodiments, the arrangement, size, and/or shape of the electrodes may be different.

According to an exemplary embodiment, the set of electrodes 506 is detachably coupled to the support member 522 proximate to a lower end of the support member 522 (e.g., by bolts, clips or another suitable fastener). The cartridge 520 may include insulating members (e.g., ceramic washers, dielectric spacers, etc.) in between each of the electrodes so as to prevent the electrodes from shorting together. A length of the support member 522, substantially normal to the housing 512, may be sized to ensure the electrodes 506 are at least partially disposed beneath the brine in the reservoir 514. In order to access the electrode cartridge 520, the user may simply remove the first access cap 508, lifting it outward and away from the housing 512. Among other benefits, incorporating a serviceable electrode cartridge 520 simplifies the maintenance and repair process as compared with a design where the electrodes 506 are directly coupled to the housing 512.

As shown in FIG. 8, the second access cap 510 provides access to a first portion 516 of the reservoir 514, into which the user may place, pour, or otherwise deposit salt for the chemical reaction. The salt may be provided to the electro-chlorinating device 502 through a salt port 521 beneath the second access cap 510. According to an exemplary embodiment, salt is provided to the housing 512 in the form of granules so as to more fully utilize the available capacity of the reservoir 514.

Figure 9:
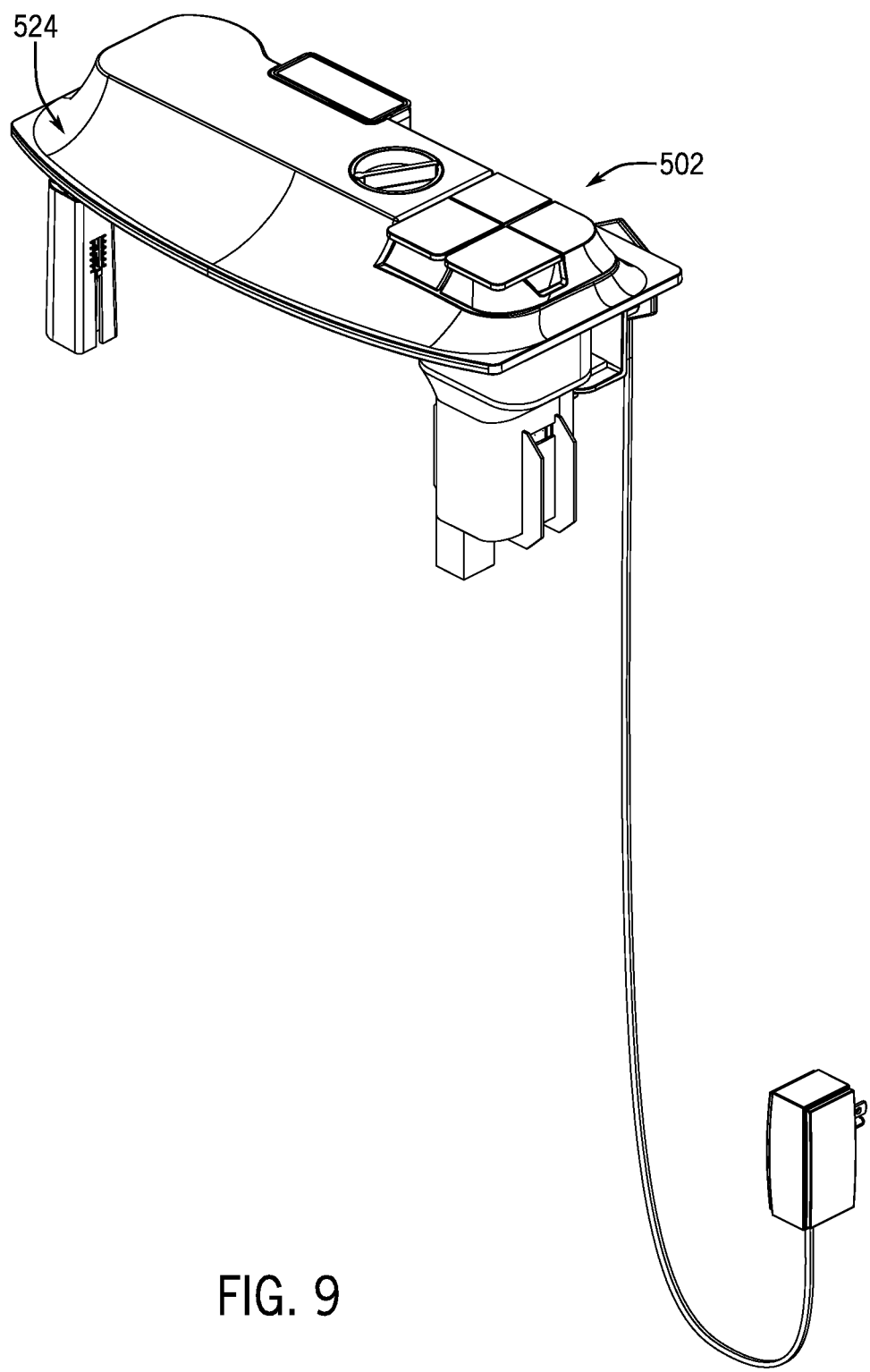
FIGS. 9-11 are perspective views of an electro-chlorinating device from the toilet cleaning system of FIG. 5, according to an exemplary embodiment.
Figure 10:
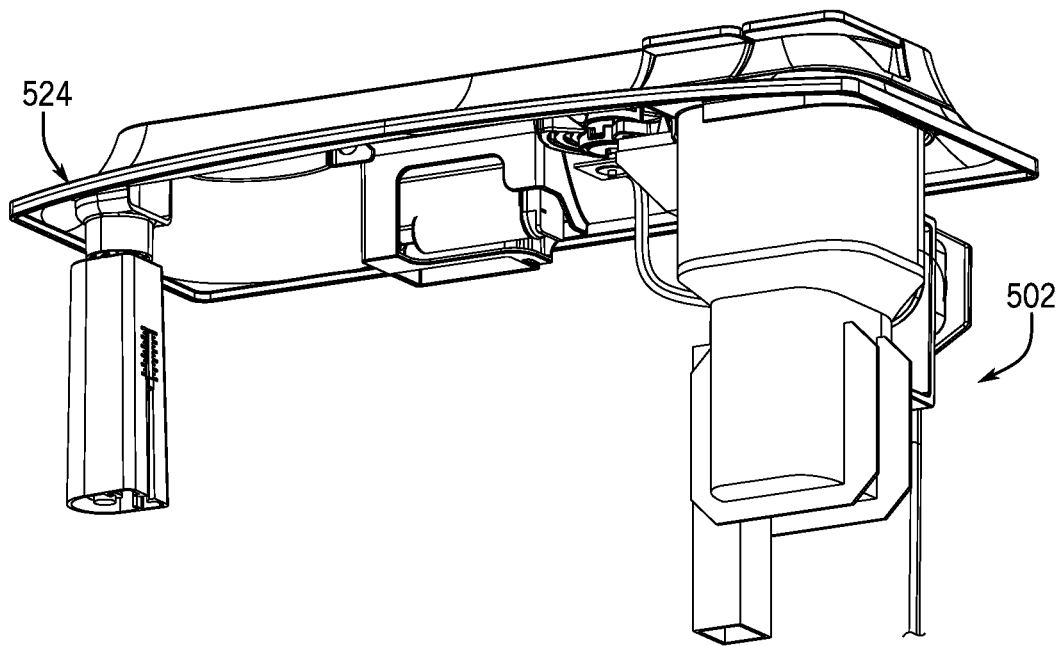
Figure 11:
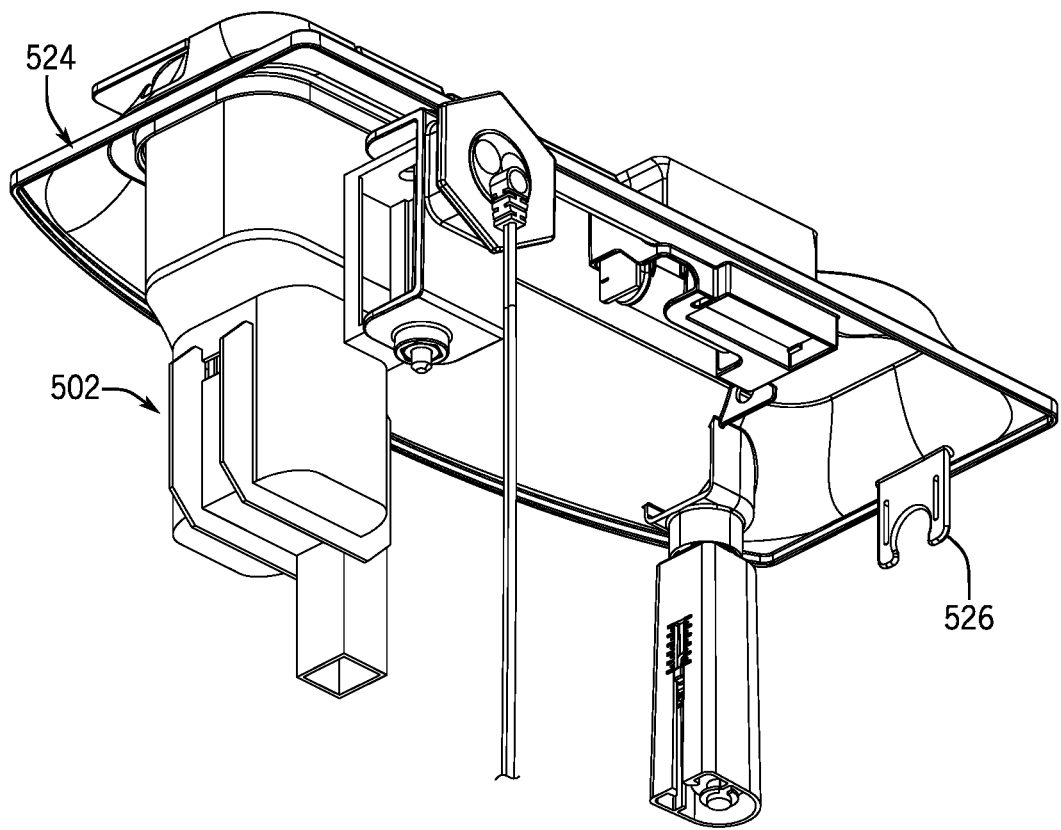

FIGS. 9-11 show different perspective views of the electro-chlorinating device 502 of FIG. 5. As shown in FIGS. 9-11, the device 502 includes a mounting plate 524 coupled (e.g., via clips, bolt, or another suitable fastener) to the housing 512. According to an exemplary embodiment, the mounting plate 524 includes a mounting member 526 configured to detachably couple the electro-chlorinating device 502 to the flush tank 20. As shown in FIG. 11, the mounting member 526 may include a clip or support post configured to engage with a flush lever for the toilet 10, so as to level electro-chlorinating device 502 with respect to the flush tank 20. According to an exemplary embodiment, the electro-chlorinating device 502 also includes one or more sensors coupled to the mounting plate 524 and configured to measure a condition of the water in the flush tank 20. The sensors may include a water level sensor configured to determine a height of the water in the flush tank 20. Alternatively, or in combination, the sensors may include a conductivity sensor configured to determine an electrical conductivity or salinity of the water in the flush tank 20. These sensors can, advantageously, be used as health monitoring sensors for the device 502 and to control the device 502. For example, in a situation where an unusually high water level is detected, the sensors may be configured to deactivate a power supply for the device 502 so as to prevent user injury (e.g., electrocution as a result of overflowing water coming into contact with a user, etc.).

As shown in FIGS. 5-8, the mounting plate 524 extends across a top opening of the flush tank 20 and substantially fills a space above the water-line 30 in the flush tank 20. Among other benefits, the mounting plate 524 prevents a user from coming into contact with the cleaning solution. In some embodiments, the mounting plate 524 may further include an exhaust opening configured to facilitate the removal of hydrogen gas and other gaseous byproducts produced during the chemical reaction.

Figure 13:
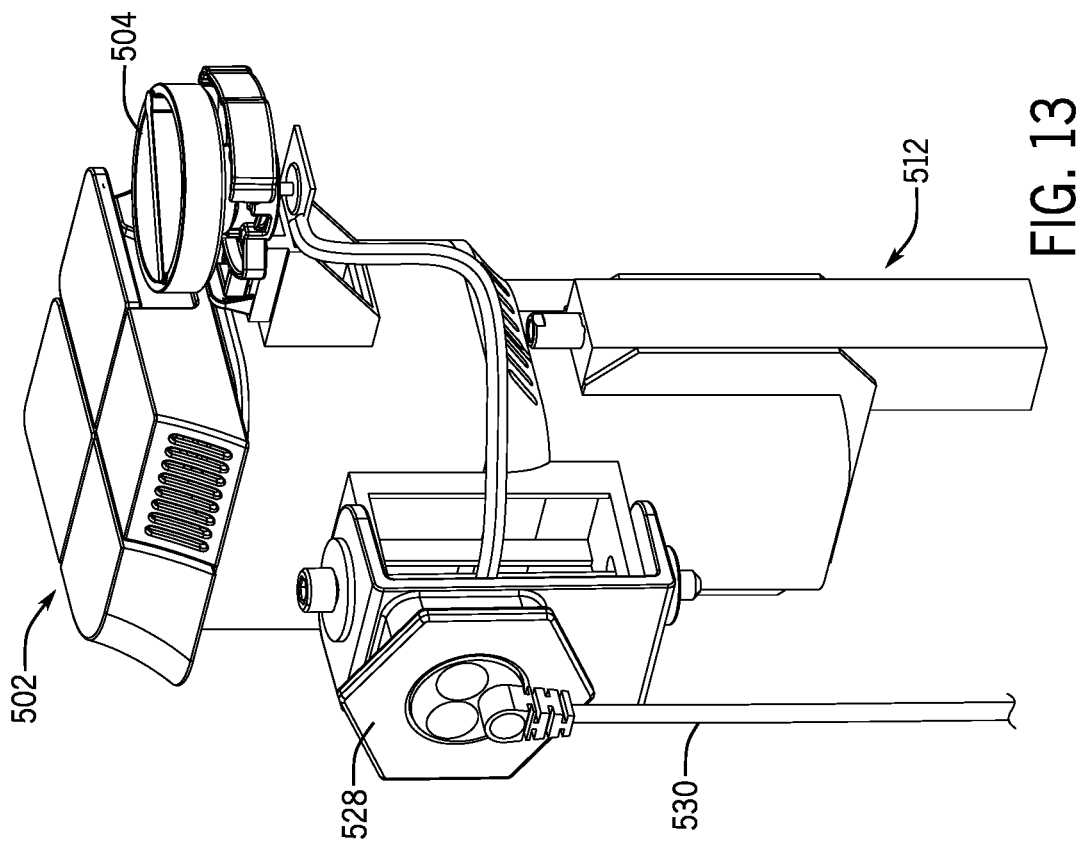
FIGS. 12-14 are perspective views of an electro-chlorinating device from the toilet cleaning system of FIG. 5, according to an exemplary embodiment.
Figure 12:
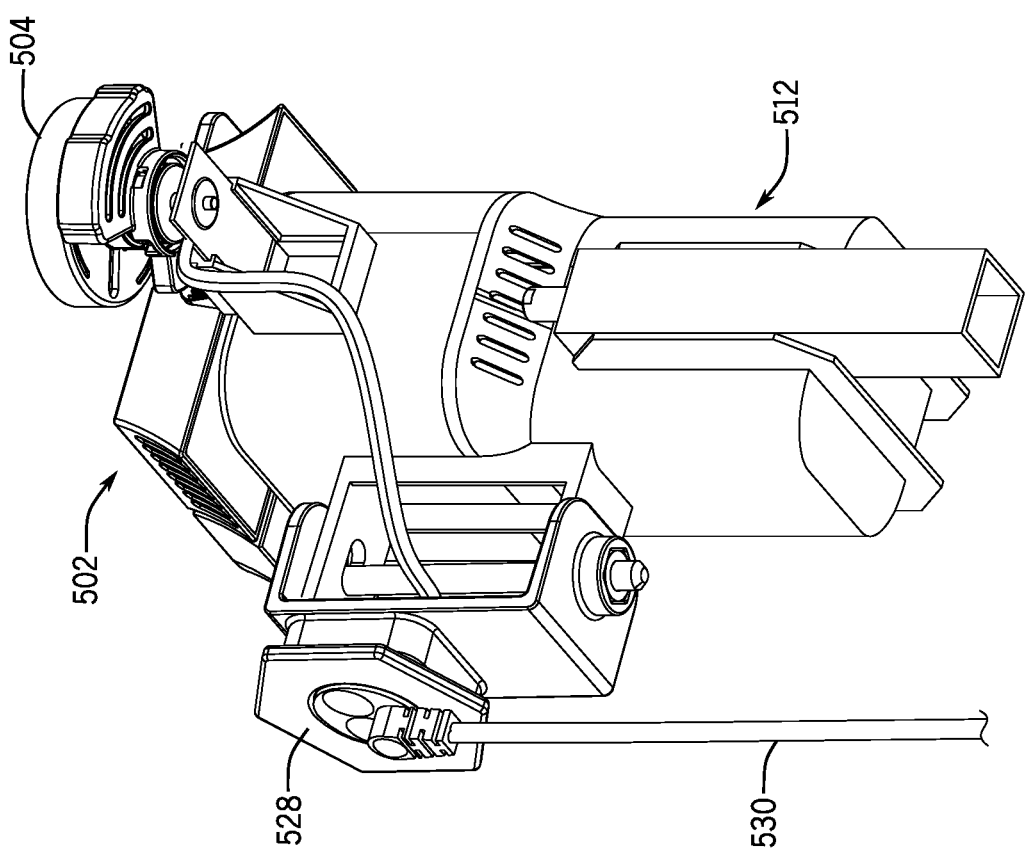
Figure 14:
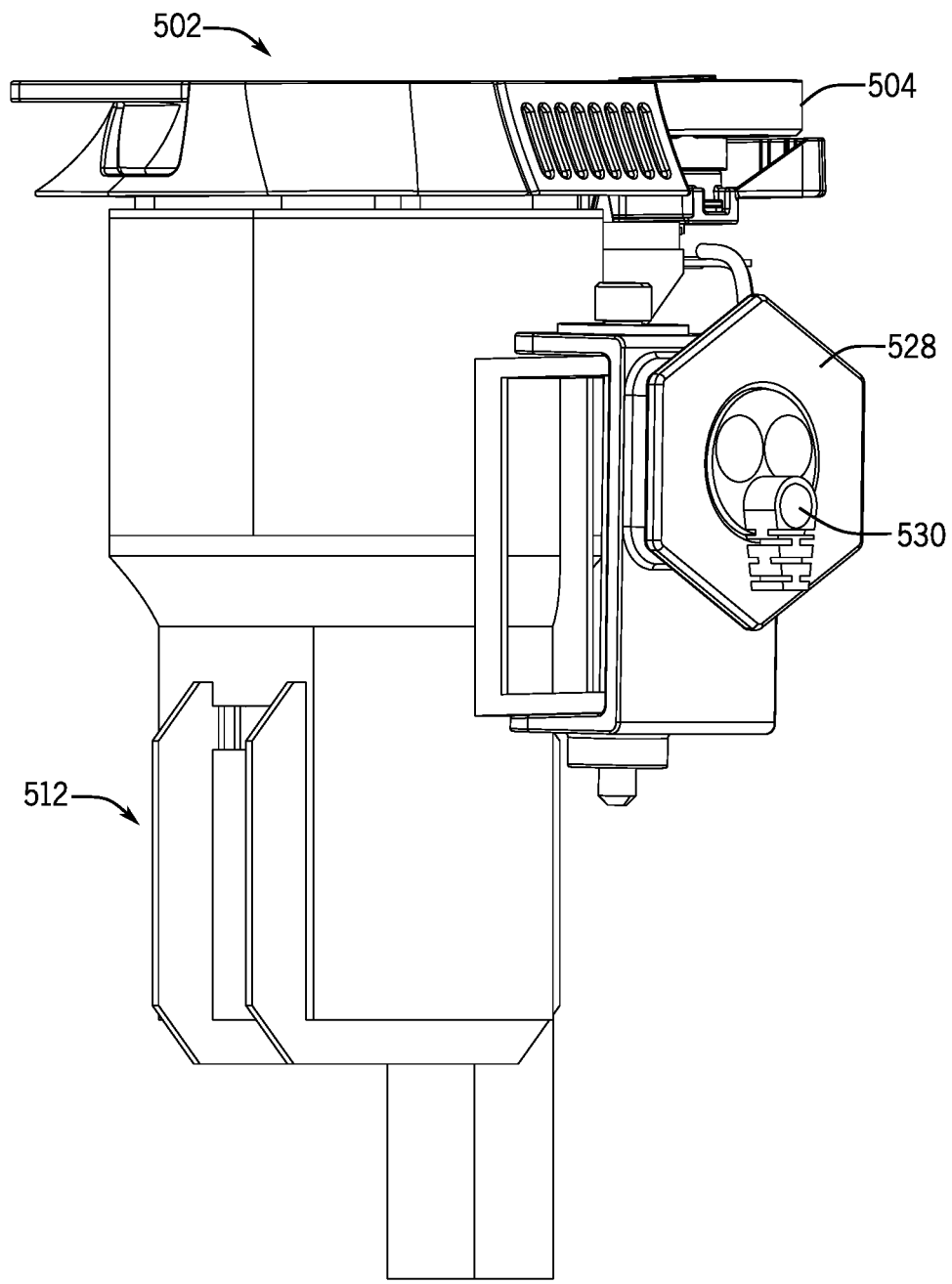

FIGS. 12-14 show perspective views of the housing 512 for the electro-chlorinating device 502 in isolation from the mounting plate 524 (see also FIGS. 9-11). As shown in FIGS. 12-14, the electro-chlorinating device 502 includes a rheostat 504 configured to control the voltage and current provided to the set of electrodes 506. The rheostat 504 provides a functionality by which a user may change the concentration of the chlorinated solution. According to an exemplary embodiment, the rheostat 504 includes a dial configured to allow the user to activate the set of electrodes 506 (e.g., by rotating the dial clockwise from an off position to an on position) and also to selectively control the amount of voltage delivered to the electrodes (e.g., by continuing to rotate the dial clockwise until the desired operational setting has been achieved). In some embodiments, the electro-chlorinating device 502 may additionally include a timer configured to control an operating frequency of the device 502 or another operational parameter. The device 502 may also include one or more sensors disposed in the reservoir 514 and configured to provide feedback to the user (e.g., through an indicator viewable from the mounting plate 524, etc.).

As shown in FIGS. 12-14, the device 502 additionally includes a fan 528 or other form of fluid displacement device configured to facilitate the removal of hydrogen and other gaseous byproducts from the flush tank 20. The device 502 also includes a power supply 530 coupled to the housing 512 proximate to the fan 528. The power supply 530 may include an inverter configured to provide direct current (DC) to the electrodes. The power supply 530 may also be configured to power the fan 528, and any other sensors or viewable indicators (e.g., lights, alarms, etc.) for the electro-chlorinating device 502.

Figure 16:
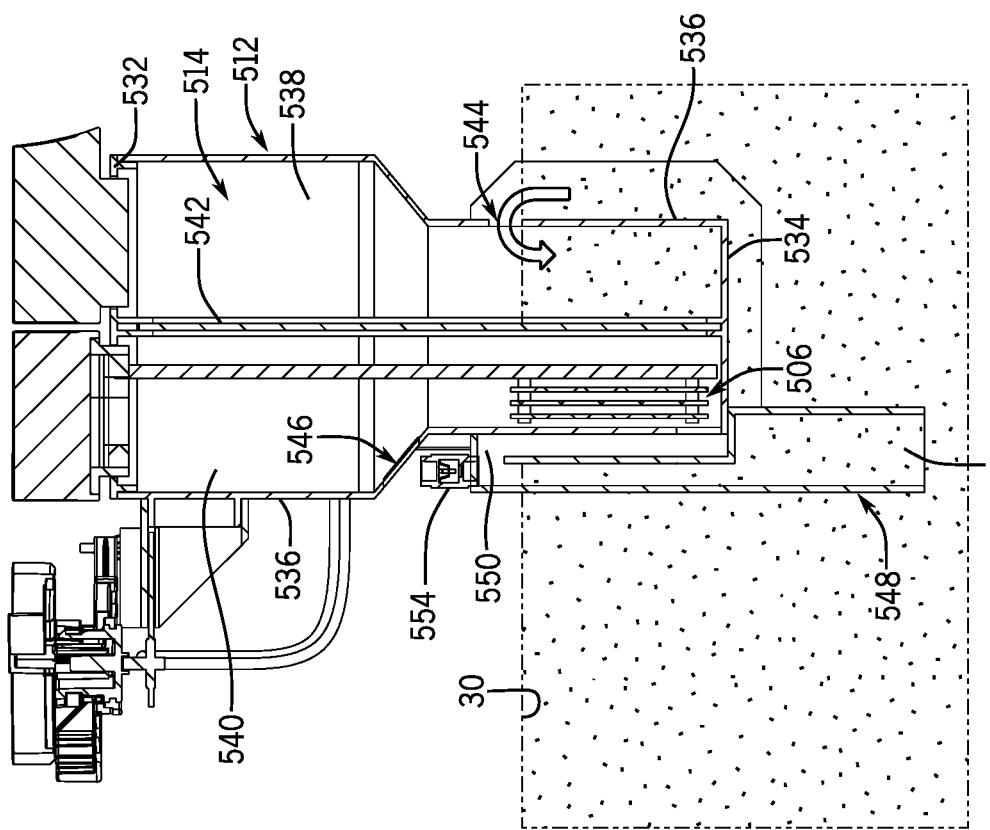
FIG. 16 is a front sectional view of the electro-chlorinating device of FIG. 9.
Figure 15:
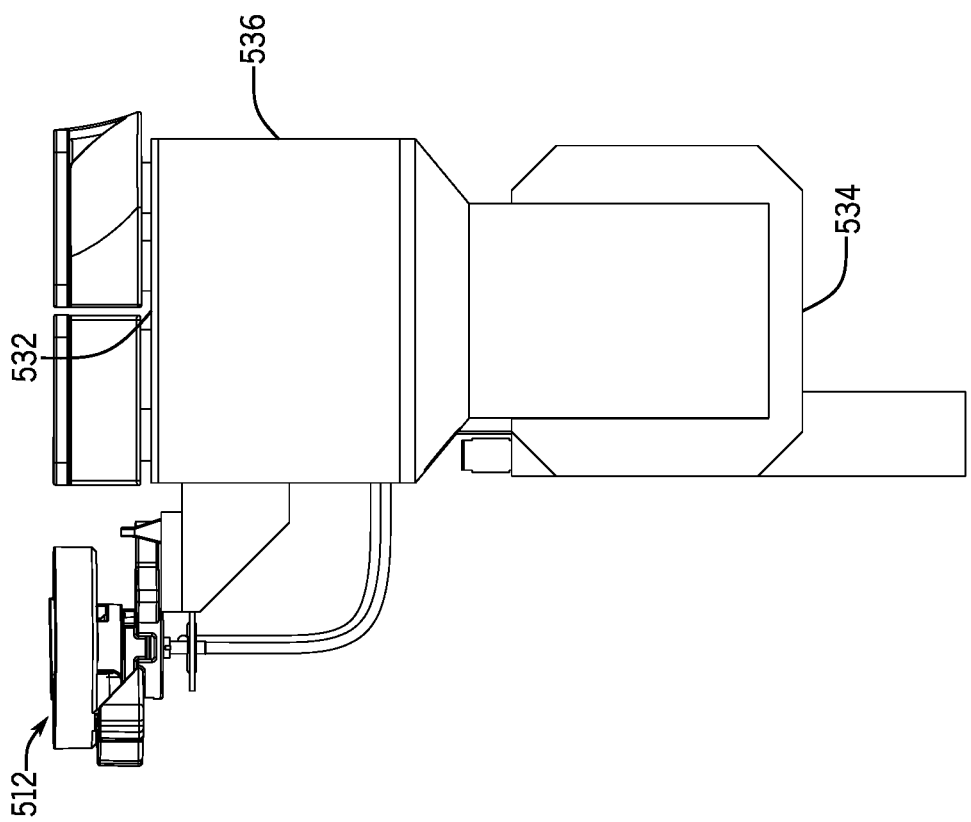
FIG. 15 is a front view of the electro-chlorinating device of FIG. 9.

FIG. 15 shows a front view of the housing 512 of FIG. 5. FIG. 16 shows a front view of the housing 512 at a cross-section through the reservoir 514. As shown in FIGS. 15-16, the housing 512 includes an upper wall 532, a lower wall 534, and side walls 536. As shown in FIG. 16, the reservoir 514 is subdivided into two portions, a first portion 538 configured to receive salt, and a second portion 540 configured to receive the set of electrodes 506. In the embodiment of FIG. 16, the first portion 538 and the second portion 540 are fluidly coupled to one another by a membrane 542. The membrane 542 may include a permeable barrier, which is used to contain the salt in the first portion 538 and to prevent any solids from passing into the second portion 540. According to an exemplary embodiment, the membrane 542 includes a fine mesh, netting, or finely perforated plate configured to allow fluids to pass between the first portion 538 and the second portion 540.

As shown in FIG. 16, the housing 512 (e.g., the side walls 536) defines an inlet port 544, an exhaust vent 546, and a siphon 548 (e.g., a discharge device, etc.), each of which is fluidly coupled to one of the first portion 538 and the second portion 540 of the reservoir 514. According to an exemplary embodiment, the inlet port 544 is disposed proximate to the water-line 30 of the flush tank 20 (e.g. a level at which a float valve or other metering valve is configured to stop the flow of water into the flush tank 20). The inlet port 544 is configured to fluidly couple the first portion 538 of the reservoir 514 to the flush tank 20 near a conclusion of the fill process for the flush tank 20. Due to its position on the housing 512, the inlet port 544 also helps to prevent the chlorinated solution (e.g., reaction products) from escaping the reservoir 514 and entering the flush tank 20 in between flush events. FIG. 14 shows the inlet port 544 from outside of the housing 512. As shown in FIG. 14, the inlet port 544 is configured as a single rectangular opening. In other embodiments, the size, shape, and/or number of openings may be different.

As shown in FIG. 16, the exhaust vent 546 is disposed in the second portion 540 of the reservoir 514, in the side wall 536 above the water-line 30 in the flush tank 20. The exhaust vent 546 serves at least two functions. First, the exhaust vent 546 provides a path through which hydrogen and other gaseous byproducts may be vented from the reservoir 514, thereby reducing the buildup of gases and preventing the housing 512 from becoming over pressurized. Secondly, the exhaust vent 546 provides integrated overflow protection for the electro-chlorinating device 502. As shown in FIGS. 12-13, the exhaust vent 546 is configured as a plurality of slots arranged on an inclined portion of the side wall 536. In other embodiments, the number, shape, and size of the slots may be different.

Returning to FIG. 16, the siphon 548 is configured to coordinate removal of the chlorinated solution from the housing 512 with a flush event. The siphon 548 may be the same or substantially the same as the siphon 326, 426 described in detail with reference to FIGS. 3-4. Again, the siphon 548 may include an inverted U-shaped channel including a first leg 550 and a second leg 552 fluidly coupled thereto. As shown in FIG. 16, the siphon 548 may also include a valve 554 coupled to the siphon 548 proximate an intersection between the first leg 550 and the second leg 552. According to an exemplary embodiment, the valve 554 is a check valve configured to prevent air from being pulled into the siphon 548 near the beginning of a flush event and to allow air to exit from the siphon 548 during a period when the flush tank 20 is refilling.

Figure 18:
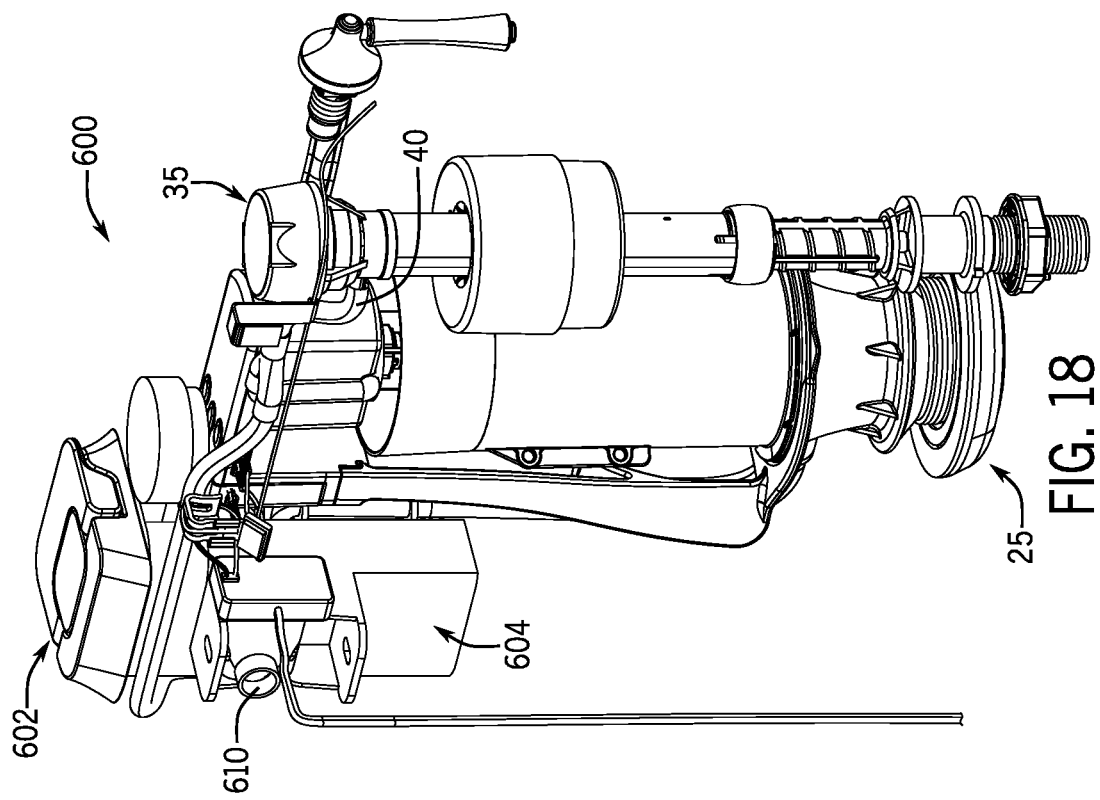
FIG. 18 is a rear perspective view of the electro-chlorinating device and flush system of FIG. 17.
Figure 17:
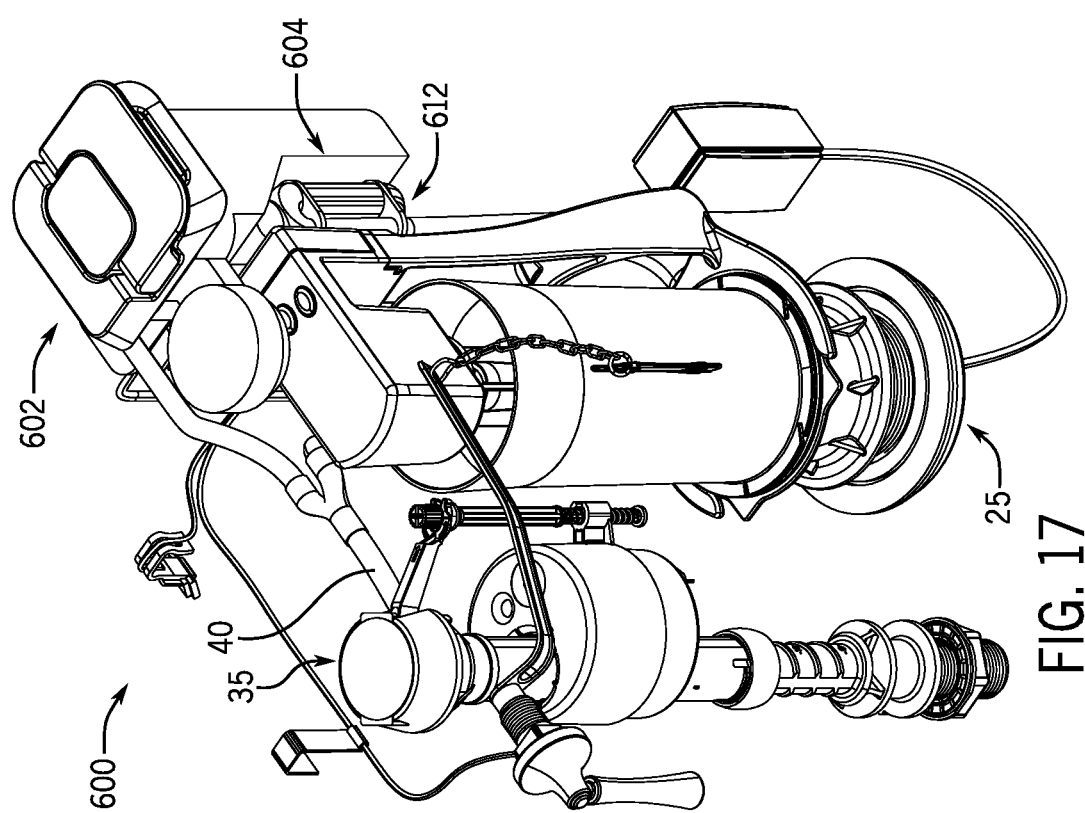
FIG. 17 is a front perspective view of an electro-chlorinating device and a flush system, according to an exemplary embodiment.
Figure 19:
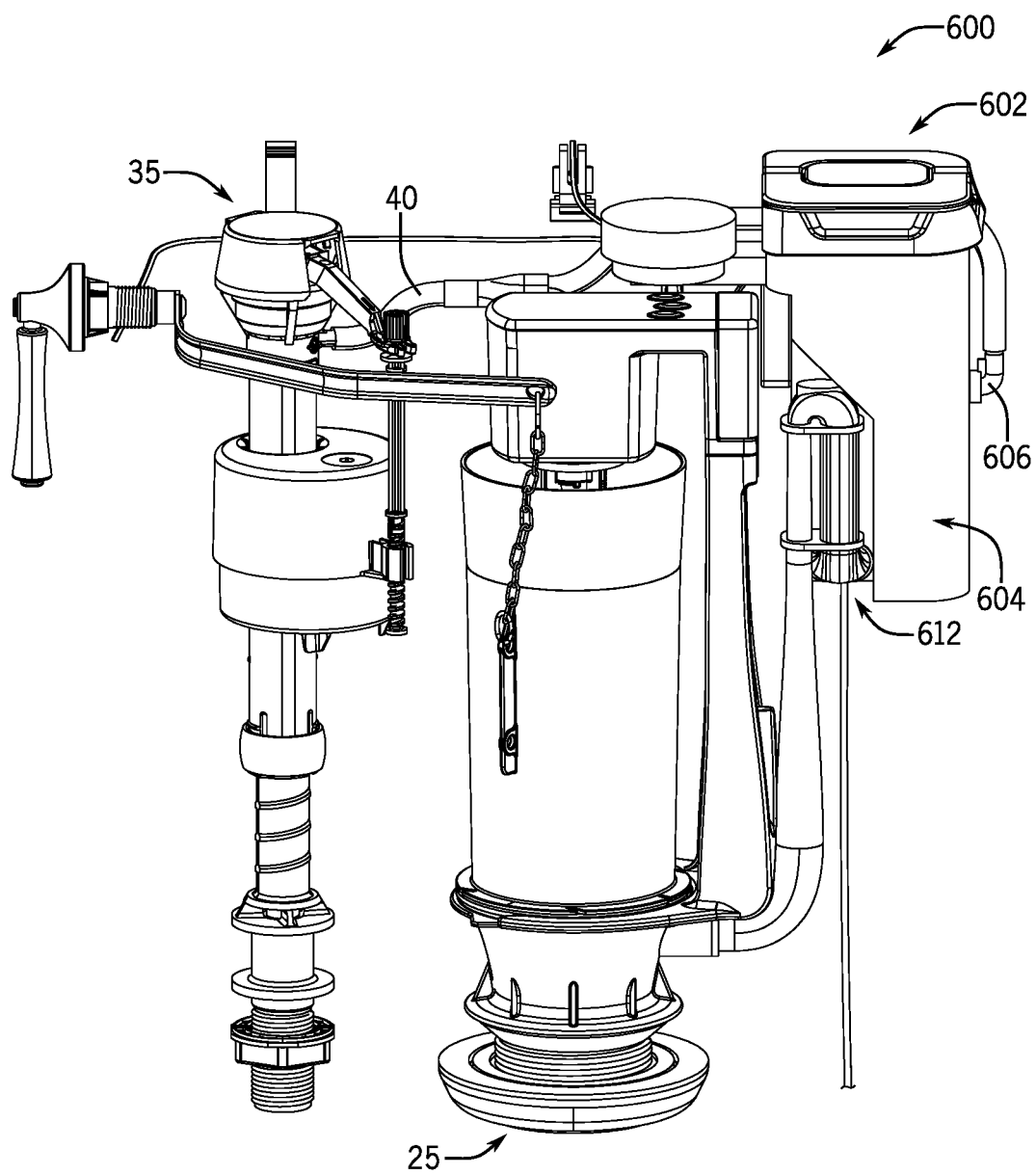
FIG. 19 is a front view of the electro-chlorinating device and flush system of FIG. 17.
Figure 20:
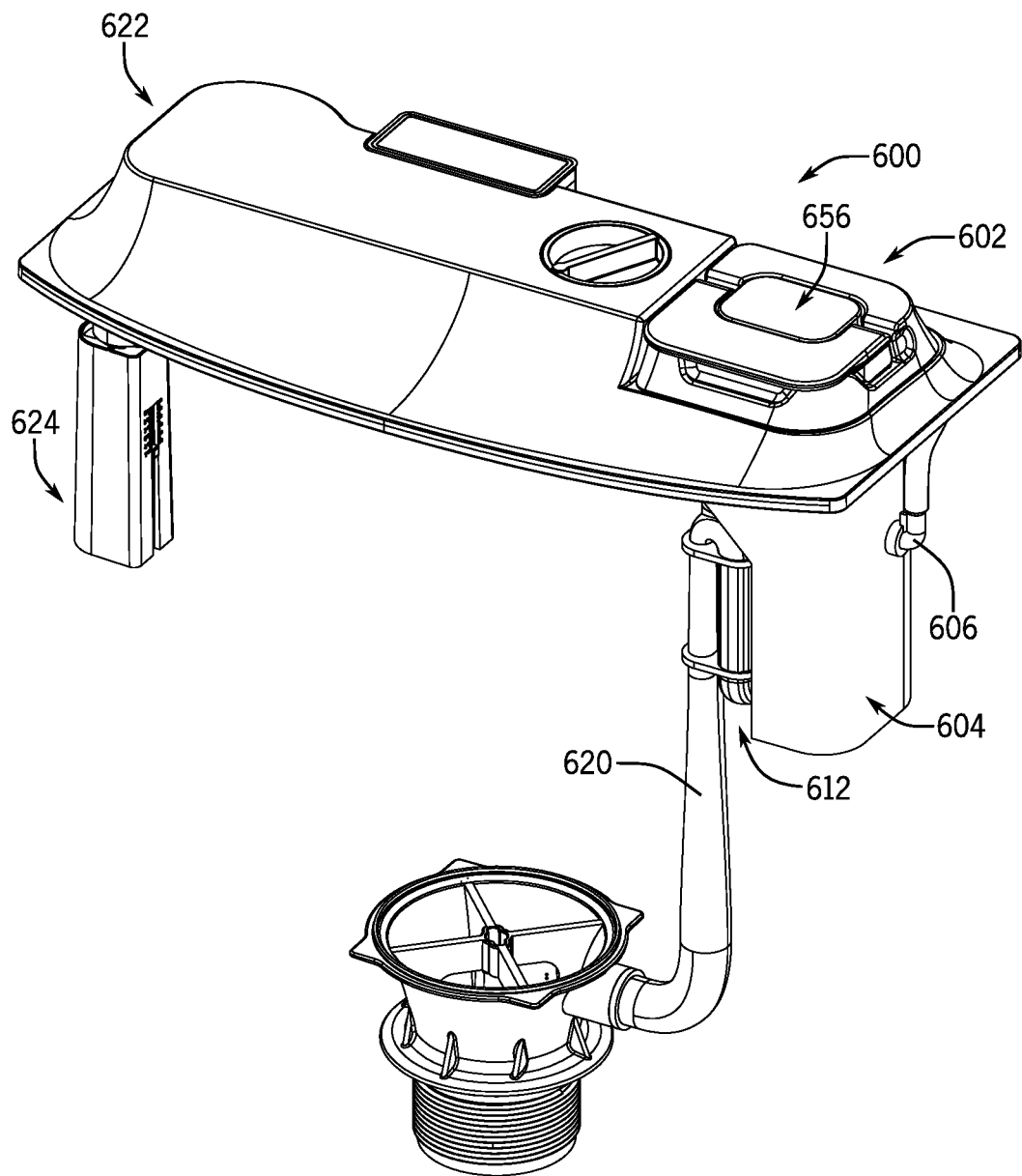
FIG. 20 is a front perspective view of a portion of a toilet cleaning system, according to an exemplary embodiment.

FIGS. 17-22 show a toilet cleaning system 600 including an electro-chlorinating device 602 that is contained entirely within the flush tank 20, according to another exemplary embodiment. As shown in FIGS. 19-20, the electro-chlorinating device 602 includes a housing 604 including an inlet port 606 configured to receive water from a fill valve 35 in the flush tank 20. As shown in FIGS. 17-19, the inlet port 606 is directly connected to the fill valve 35 and receives water continuously throughout the flush cycle (e.g., starting when the flush valve 25 opens and ending once the water level returns to the water-line 30 in the flush tank 20). The inlet port 606 receives water through a conduit 40 (e.g., a connecting line, flow tube, etc.) that is fluidly coupled to the fill valve 35. The conduit 40 may include an insert to control an amount of water provided to the electro-chlorinating device 602 during a flush event. The insert may include an orifice or another flow restriction to reduce the amount of water provided to the electro-chlorinating device 602.

According to an exemplary embodiment, the housing 604 is at least partially submerged beneath the water-line 30 of the flush tank 20. The housing 604 defines a reservoir 608, a vent 610 (see FIG. 18), and a siphon 612 (e.g., a discharge device, etc.). Both the vent 610 and the siphon 612 are fluidly coupled to the reservoir 608. The reservoir 608 is subdivided into two portions, a first portion configured to receive a salt, and a second portion configured to receive a pair of electrodes. The shape of the reservoir 608 and arrangement of components within the reservoir 608 will be described in more detail with reference to FIGS. 24-25.

As shown in FIG. 18, the vent 610 is disposed on a side of the housing 604 and is configured to be disposed a distance above the water-line 30 of the flush tank 20 (see also FIG. 1). The vent 610 may be a small hole or opening in the side of the flush tank 20. The vent 610 is configured to allow hydrogen and other gaseous byproducts to escape to an environment surrounding the flush tank 20 (e.g., through a wall of the flush tank 20 to a bathroom of a building).

Figure 21:
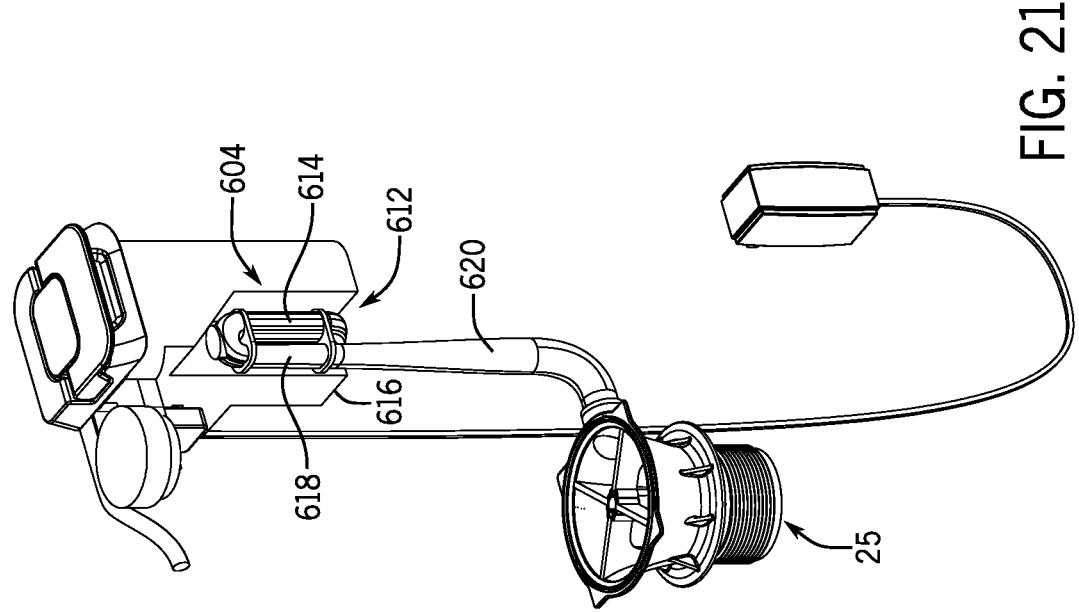
FIG. 21 is a front perspective view of the electro-chlorinating device of FIG. 17.

According to an exemplary embodiment, the siphon 612 is configured to coordinate the release of the cleaning solution, from the reservoir 608 into the flush tank 20, with a flush event. As shown in FIG. 21, the siphon 612 includes an inverted U-shaped channel having two substantially parallel legs, a first leg 614 fluidly coupled to the reservoir 608 and extending upward from a lower wall 616 of the housing 604, and a second leg 618 extending downward (e.g., toward the lower wall 616) from an upper portion of the first leg 614. During a flush event, water leaving the siphon 612 through the second leg 618 draws fluid (e.g., cleaning solution) up through the first leg 614 and into the second leg 618, triggering a siphon effect. The flow of water through the siphon 612 continues until the level of water or cleaning solution in the reservoir 608 drops below an intake port of the siphon 612 (e.g., a level at which the first leg 614 is fluidly coupled to the housing 604). In some embodiments, the siphon 612 may also include a valve coupled to the siphon 612 proximate an intersection between the first leg 614 and the second leg 618. The valve may include a check valve configured to prevent air from being pulled into the siphon 612 near the beginning of a flush event and to allow air to exit from the siphon 612 during a period when the flush tank 20 is refilling.

Figure 22:
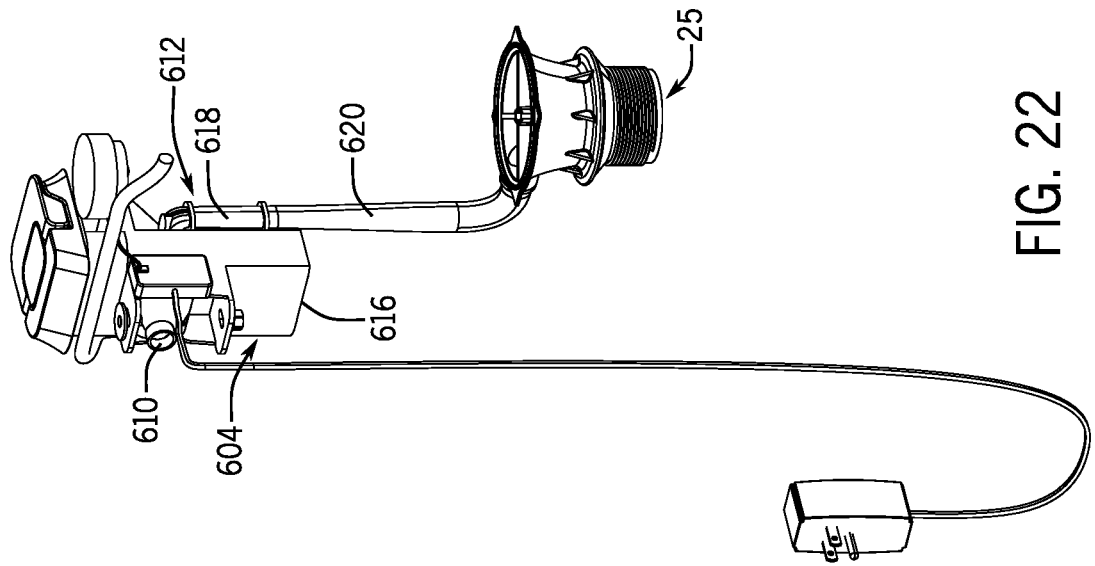
FIG. 22 is a rear perspective view of the electro-chlorinating device of FIG. 17.

As shown in FIGS. 21-22, an outlet of the second leg 618 is fluidly coupled to the flush valve 25, which, advantageously, prevents the cleaning solution from entering the flush tank 20. In other embodiments, the second leg 618 ejects cleaning solution directly into the water in the flush tank 20. Among other benefits, fluidly coupling the second leg 618 to the flush valve 25 minimizes the residual chemistry in the flush tank 20, which could damage tank trim and other components in the flush tank 20. As shown in FIGS. 21-22, the electro-chlorinating device 602 includes a chemical passage 620 extending between an outlet to the second leg 618 (e.g., proximate to the lower wall 616 of the housing 604) and an inlet to a lower portion of the flush valve 25. The chemical passage 620 is integrally formed with the siphon 612. In other embodiments, the chemical passage 620 may include a separate pipe, tube, or flow conduit that is coupled to both the second leg 618 and the flush valve 25. Flow leaving through the chemical passage 620 enters the flush valve 25 below a canister of the flush valve 25, through an opening in a side of the flush valve 25 (e.g., a portion of the flush valve 25 that is fixed in position relative to the flush tank 20).

Returning now to FIG. 20, the electro-chlorinating device 602 includes a mounting plate 622 coupled (e.g., via clips, bolts, or another suitable fastener) to the housing 604. According to an exemplary embodiment, the mounting plate 622 includes a flush counter 624 configured to count a number of flushes. The flush counter may be coupled to a controller that is configured to energize the electrodes in response to a flush. The controller may be configured to track a number of flushes and to indicate to a user when the salt is running low (e.g., in response to a number of flushes exceeding a predefined threshold). According to an exemplary embodiment, the electro-chlorinating device 602 also includes one or more sensors coupled to the mounting plate 622 and configured to measure a condition of the water in the flush tank 20. The sensors may include a water level sensor configured to determine a height of the water in the flush tank 20. Alternatively, or in combination, the sensors may include a conductivity sensor configured to determine an electrical conductivity or salinity of the water in the flush tank 20. These sensors can, advantageously, be used as health monitoring sensors for the device 602 and to control the device 602. For example, in a situation where an unusually high water level is detected, the sensors may be configured to deactivate a power supply for the device 602 to prevent user injury (e.g., electrocution as a result of overflowing water coming into contact with a user, etc.).

In some embodiments, the mounting plate includes at least one mounting member that detachably couple the electro-chlorinating device 602 to the flush tank 20. The mounting member(s) may include a clip or support post configured to engage with a flush lever for the toilet 10 or another piece of hardware within the flush tank, so as to level the electro-chlorinating device 902 with respect to the flush tank 20 and to prevent movement of the electro-chlorinating device within the flush tank 20.

The mounting plate 622 is configured to extend across a top opening of the flush tank 20 and substantially fill a space above the water-line 30 in the flush tank 20. Among other benefits, the mounting plate 622 prevents a user from tampering with connections for the electro-chlorinating device 602 (e.g., the connection between the chemical passage 620 and the flush valve 25, the connection between the fill valve 35 and the inlet port 606, etc.). In some embodiments, the mounting plate 622 further includes an exhaust opening configured to facilitate the removal of hydrogen gas and other gaseous byproducts produced during the chemical reaction.

The size, shape, and arrangement of the components shown in FIGS. 2-22 should not be considered limiting. It will be appreciated that many alternatives are possible without departing from the inventive concepts disclosed herein. For example, in FIGS. 17-22, the size of the housing 604 may be modified to accommodate a larger amount of salt or a greater number of electrodes. Additionally, the position of the siphon 612 relative to the housing 604 may be modified to improve fitment in the flush tank 20.

Figure 23:
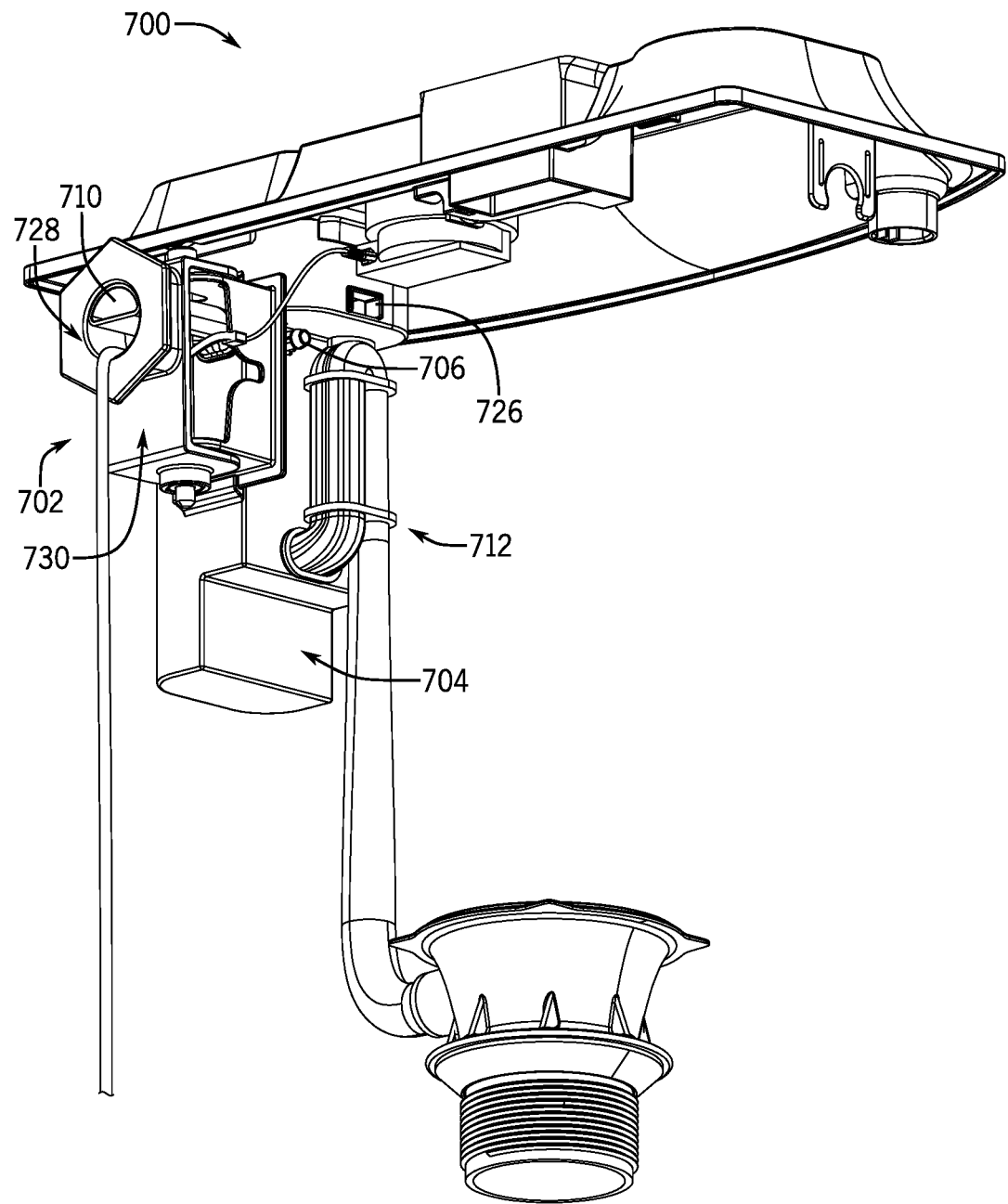
FIG. 23 is rear perspective view of a portion of a toilet cleaning system, according to another exemplary embodiment.

Referring now to FIG. 23, an electro-chlorinating device 702 is shown, according to another exemplary embodiment. As with the device 602 of FIGS. 17-22, the device 702 of FIG. 23 may form part of a toilet cleaning system 700. As shown in FIG. 23, the device 702 includes a housing 704 including an inlet port 706, a reservoir 708, a vent 710, and a siphon 712 (e.g., a discharge device, etc.). As shown in FIG. 23, the inlet port 706 is disposed on a same side of the housing 704 as the siphon 712 proximate to an upper portion of the siphon 712. The housing 704 also includes an exhaust port 726 on a side of the housing 704, proximate an upper wall of the housing 704 above the water-line 30 in the flush tank 20 (see also FIG. 1). The exhaust port 726 serves at least two functions. First, the exhaust port 726 provides a path through which hydrogen and other gaseous chemical byproducts may be vented from the reservoir 708, thereby reducing the buildup of gases and preventing the housing 704 from becoming over pressurized. Secondly, the exhaust port 726 provides integrated overflow protection for the electro-chlorinating device 702. As shown in FIG. 23, the exhaust port 726 is configured as a rectangular opening. In other embodiments, the number, shape, and size of the exhaust port 726 may be different.

As shown in FIG. 23, the electro-chlorinating device 702 additionally includes a fluid displacement device 728 (e.g., a fan) configured to facilitate the removal of hydrogen and other gaseous chemical byproducts from the housing 704 (e.g., through the vent 710 in the housing 704 and/or the flush tank 20). The device 702 also includes a power supply 730 coupled to the housing 704 proximate to the fluid displacement device 728. The power supply 730 may include an inverter configured to provide direct current (DC) to the electrodes 742. The power supply 730 may also be configured to power the fluid displacement device 728, and any other sensors or viewable indicators (e.g., lights, alarms, etc.) for the electro-chlorinating device 702. In some embodiments, and depending on the desired amount of cleaning solution, the fluid displacement device 728 may not be required.

Figure 24:
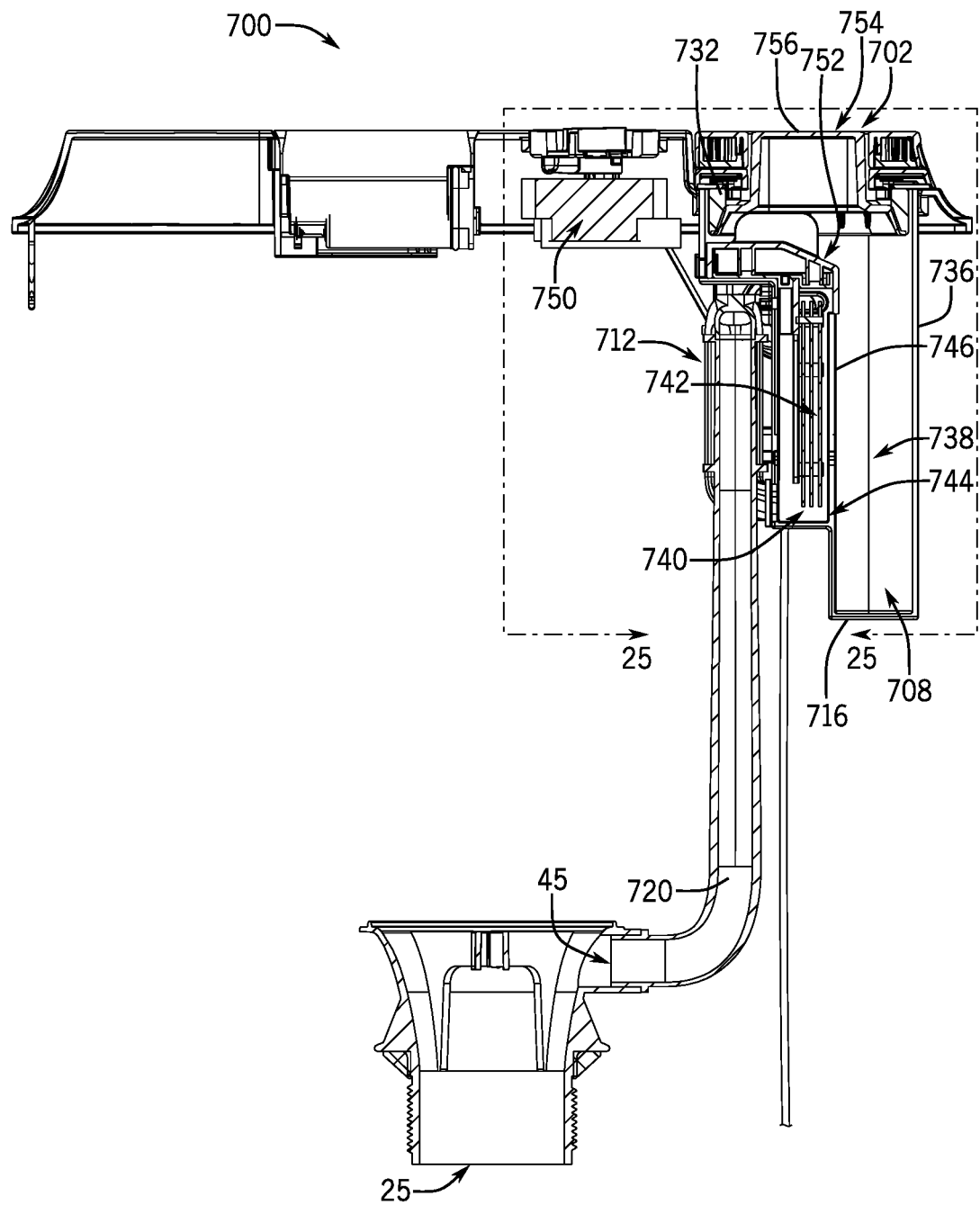
FIG. 24 is a front sectional view of the toilet cleaning system of FIG. 23, according to an exemplary embodiment.
Figure 25:
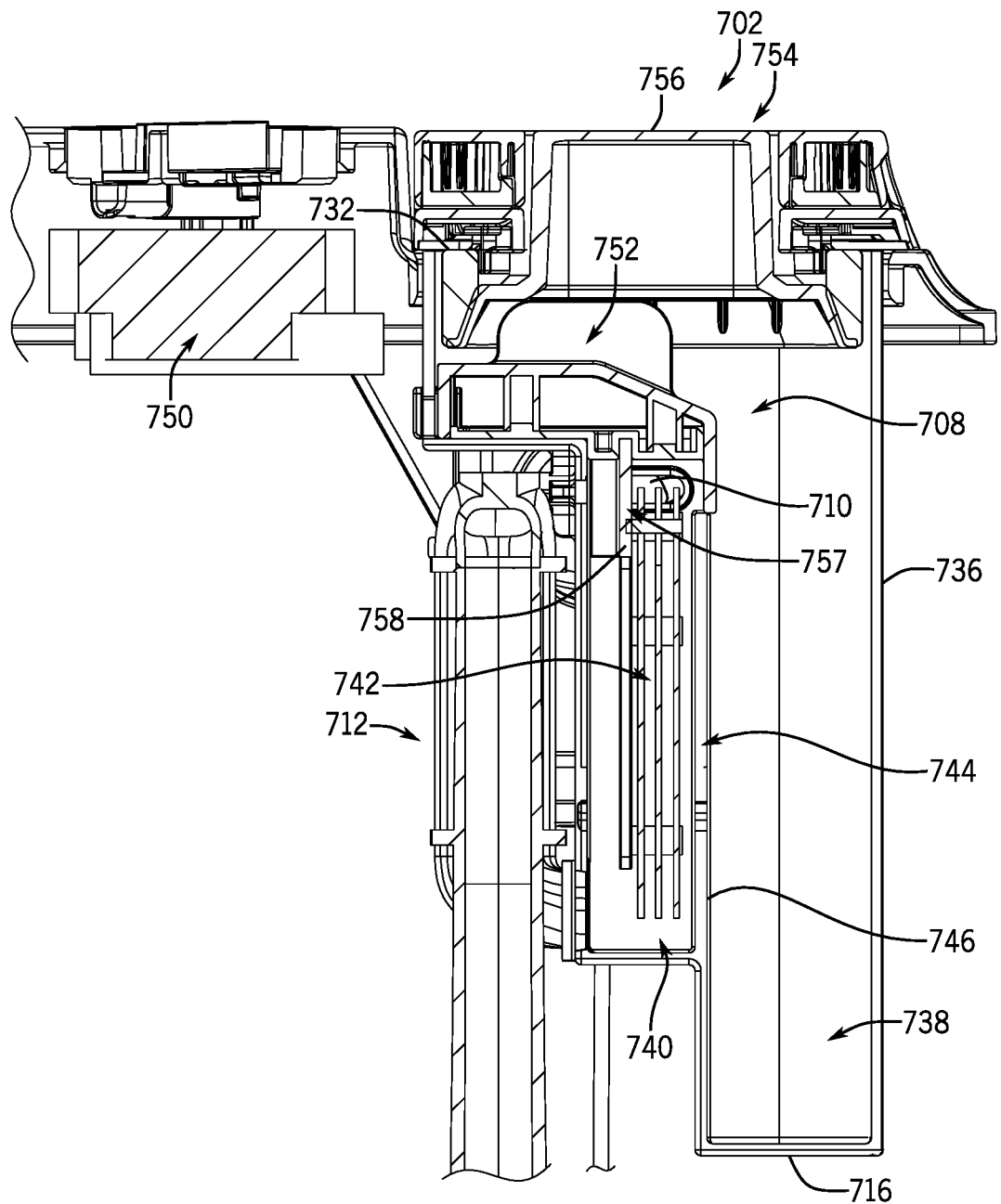
FIG. 25 is a reproduction of FIG. 24 near an electro-chlorinating device.
Figures 26A, 26B:
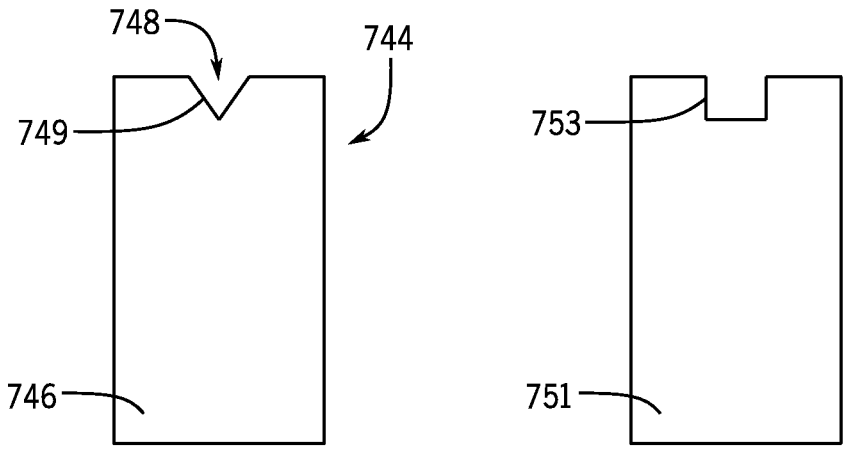
FIG. 26A is a side view of a weir of the electro-chlorinating device of FIG. 25, according to an exemplary embodiment.
FIG. 26B is a side view of a weir for an electro-chlorinating device, according to another exemplary embodiment.

FIGS. 24-25 show front views of the electro-chlorinating device 702 of FIG. 23 at a cross-section through the reservoir 708. As shown in FIGS. 24-25, the housing 704 includes an upper wall 732, a lower wall 716, and side walls 736. The reservoir 708 is subdivided into two portions, a first portion 738 configured to receive salt, and a second portion 740 configured to receive a pair of electrodes 742. In the embodiment of FIGS. 24-25, the first portion 738 and the second portion 740 are separated by a weir 744. The weir 744 includes a partition 746 over which water may pass from the first portion 738 to the second portion 740. As shown in FIGS. 24-25, the partition 746 includes a substantially vertical wall extending between the lower wall 716 and the upper wall 732 of the housing 704. As shown in FIG. 26A, the partition 746 defines a fill port 748 that fluidly couples the first portion 738 to the second portion 740, through which water, brine, or another chemical solution from the first portion 738 may enter the second portion 740. In other embodiments, the partition 746 may be replaced by a screen or water permeable membrane. Among other benefits, the partition 746 prevents large pieces of salt and other heavy contaminants from passing into the second portion 740. As shown in FIG. 26A, the fill port 748 includes a slot 749 extending downward from the upper edge of the partition 746. The slot 749 may be a V-shaped notch. In other embodiments, the shape of the fill port 748 may be different. For example, FIG. 26B shows a partition 751 including a slot 753 that is a rectangular notch. A size of the slot 749 and/or 753 may vary depending on a required flow rate through the partition 746 and 751. According to an exemplary embodiment, an aspect ratio of the slot is approximately 1:1 (e.g., a vertical height of the slot is approximately equal to a width of the slot). In some embodiments, the height and width of the slot 749 and 753 may be within a range between approximately ⅛ in. and ¼ in. In other embodiments, the height and width of the slot may be within another suitable range.

As shown in FIGS. 24-25, each of the inlet port 706, the vent 710, and the siphon 712 are fluidly coupled to one of the first portion 738 and the second portion 740. As shown in FIG. 25, an intake port to the siphon 712 is fluidly coupled to the second portion 740 proximate the lower wall 716 of the housing 704. The vent 710 and the inlet port 706 (see also FIG. 23) are fluidly coupled to the second portion 740 above an upper edge of the weir 744 (e.g., above a water-line of the second portion 740). The inlet port 706 is disposed on the same side wall 736 as the siphon 712. The vent 710 is disposed on the side wall 736 that is configured to face a rear surface of the flush tank 20 (see also FIG. 1). The exhaust port 726 is disposed above the inlet port 706 and the vent 710, proximate to the upper wall 732 of the housing 704.

The siphon 712 is configured to coordinate removal of the chlorinated solution from the housing 704 with a flush event. The siphon 712 also provides overflow protection for the reservoir 708. The siphon 712 may be the same or substantially the same as the siphon 612 described in detail with reference to FIGS. 17-22. Again, the siphon 712 includes an inverted U-shaped channel. As shown in FIG. 24, the siphon 712 is fluidly coupled to a chemical passage 720 extending substantially vertically between the siphon 712 and a lower portion of the flush valve 25. As shown in FIG. 24, the chemical passage 720 is coupled to an opening 45 along a converging portion of the flush valve 25 (e.g., a portion of flush valve passage characterized by decreasing cross-sectional area in the flow direction). Once activated, water passing through the flush valve 25 creates a venturi (e.g., a discharge device, etc.) that pulls the chemical solution out of the second portion 740 through the siphon 712. In other embodiments, a pump may be used to transfer the chemical solution out through the flush valve 25.

As shown in FIGS. 24-25, the reservoir 708 is configured to receive a pair of electrodes 742. The electrodes 742 extend upward from the lower wall 716 of the reservoir 708 to a location proximate to the fill port 748 (e.g., just above a water-line of the reservoir 708, etc.). The electrical connections for the electrodes 742 are disposed proximate to an upper end (e.g., a dry end) of the electrodes 742 or otherwise insulated from the water in the reservoir 708 to prevent an electrical short.

As shown in FIGS. 24-25, the electro-chlorinating device 702 includes a rheostat 750 configured to control the voltage and current provided to the set of electrodes 742. The rheostat 750 provides a functionality by which a user may change the concentration of the chlorinated solution. According to an exemplary embodiment, the rheostat 750 includes a dial configured to allow the user to manually activate the electrodes 742 (e.g., by rotating the dial clockwise from an off position to an on position) and also to selectively control the amount of voltage/current delivered to the electrodes 742 (e.g., by continuing to rotate the dial clockwise until the desired concentration of cleaning solution has been achieved). In some embodiments, the electro-chlorinating device 702 may additionally include a timer configured to control an operating frequency of the device 702 (e.g., to enable to the electrodes for 30-60 min after a flush) or another operational parameter. The device 702 may also include one or more sensors disposed within the reservoir 708. The sensors may be configured to provide feedback to the user (e.g., through an indicator viewable from a mounting plate of the device 702, etc.). In yet other embodiments, the device 702 includes a flush sensor with a timer, which activates and deactivates the electrodes 742 and the fluid displacement device 728 (if included). The device 702 may also include a flush counter to notify the user that the salt needs to be replenished. Alternatively, or in combination, the device 702 may perform a conductivity check to determine that the salt concentration is low (e.g., that the conductivity of the fluid in the brine tank is low). The size of the reservoir (e.g., the size of the second portion 740 of the reservoir 708, etc.) may be adjusted to maximize the maintenance interval for the device 702. According to an exemplary embodiment, the device 702 is configured to hold at least a year's supply of salt.

As shown in FIGS. 24-25, the electro-chemical device 702 also includes a plurality of service access caps, shown as inner access cap 752 and outer access cap 754. As shown in FIGS. 23-24, each access cap 752 and 754 is detachably (e.g., removably) coupled to the housing 704 of the electro-chemical device 702. The access caps 752 and 754 are configured to provide access to a portion of a reservoir 708 within the housing 704. As shown in FIG. 25, the first portion 738 of the reservoir 708 may be accessed through the outer access cap 754. The second portion 740 of the reservoir 708 may be accessed by removing both the outer access cap 754 and the inner access cap 752. The access caps 752 and 754 may include O-rings, gaskets, and/or other types of seals that engage with the housing 704 (e.g., an inner surface of the housing 704) to prevent water, brine, or the cleaning solution from escaping through the access caps 752 and 754. In some embodiments, the access caps 752 and 754 include an exhaust vent to facilitate the removal of hydrogen and other gaseous chemical byproducts from the housing 704. According to an exemplary embodiment, the access caps 752 and 754 are configured to prevent a user from filling first portion 738 of the reservoir with salt (e.g., the outer access cap 754 must be removed in order to access the inner access cap 752).

According to an exemplary embodiment, at least one of the access caps 752 and 754 includes a quick-release cover 756 that may be reoriented to provide access to the reservoir 708. In the embodiment of FIG. 20, the device 602 includes a cover 656 including a latch that secures (e.g., locks) the cover 656 in position with respect to the housing 604. In various alternative embodiments, other types of cover latching/locking mechanisms may be utilized.

Referring now to FIG. 25, the inner access cap 752 is coupled to the electrodes 742 for ease of replacement. Together, the inner access cap 752 and the electrodes 742 form part of a removable electrode cartridge 757 configured to provide quick and easy access to the electrodes 742 during maintenance events. As shown in FIG. 25, the electrode cartridge 757 includes a support member 758 to which the inner access cap 752 and electrodes 742 are coupled. The support member 758 extends down and away from the inner access cap 752 and suspends the electrodes 742 within the second portion 740 of the reservoir 708. The device 702 of FIGS. 24-25 includes three electrodes 742, although more or fewer electrodes may be included in other embodiments. In some embodiments, the electrodes 742 may be cleaned with a light acid (e.g., vinegar) to remove any buildup on an outer surface of the electrodes 742. As shown in FIG. 25, the electrodes 742 are configured as rectangular plates oriented substantially parallel to one another so as to form a gap between pairs of electrodes 742. In other embodiments, the arrangement, size, and/or shape of the electrodes 742 may be different.

According to an exemplary embodiment, the electrodes 742 are coupled to the support member 758 proximate to a lower end of the support member 758 (e.g., using bolts, clips or another suitable fastener). The cartridge 757 may include insulating members (e.g., ceramic washers, dielectric spacers, etc.) in between each of the electrodes 742 so as to prevent the electrodes 742 from shorting together. A length of the support member 758, in a direction parallel to the electrodes 742, is greater than a height of water in the reservoir 708 (e.g., a height from the lower wall 716 of the housing 704 to the water-line of the second portion 740). In order to access the electrode cartridge 757, a user simply removes the inner access cap 752, lifting the access cap 752 upward toward the opening in the upper wall 732. Among other benefits, incorporating a serviceable electrode cartridge 757 simplifies the maintenance and repair process as compared with a design where the electrodes 742 are directly coupled to the housing 704. The user may submerge the electrodes 742 in vinegar or another solution suited for the removal of hard water buildup to maintain the performance of the device 702.

As shown in FIG. 25, the outer access cap 754 provides access to the first portion 738 of the reservoir 708, into which the user may place, pour, or otherwise deposit salt for the chemical reaction. According to an exemplary embodiment, salt is provided to the housing 704 in the form of granules so as to more fully utilize the available capacity of the reservoir 708.

Figure 27:
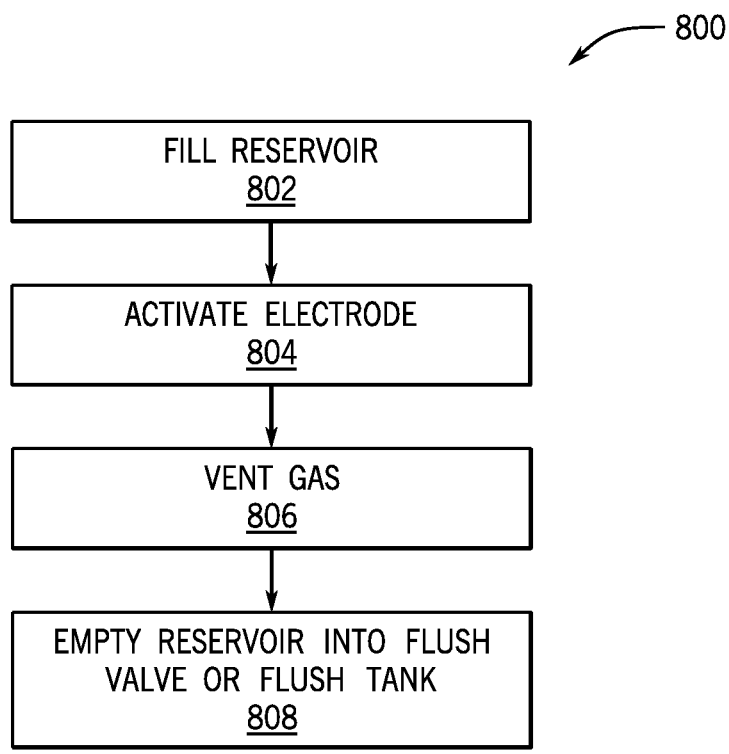
FIG. 27 is a method of operation for a toilet cleaning system, according to an exemplary embodiment.

Referring now to FIG. 27, a method 800 of operating the toilet cleaning system 600, 700 of FIGS. 17-25 is shown, according to an exemplary embodiment. In alternative embodiments, the method 800 may include additional, fewer, and/or different operations. In the following description, reference will be made to the electro-chlorinating device 702 of FIG. 25 and the toilet 10 of FIG. 1. As shown in FIG. 27, the method 800 includes filling the reservoir, at 802; activating the electrode, at 804; venting the gas from the reservoir, at 806; and emptying the reservoir into the flush tank, at 808.

At 802, the reservoir 708 fills with rising water from the flush tank 20 during a flush event. The flush event is initiated by actuating a lever on the toilet 10 to allow water to escape from the flush tank 20 through the flush valve 25. As the flush tank 20 fills, water flows from the fill valve 35 into one of the first portion 738 and the second portion 740 of the reservoir 708. The water mixes with the salt in the first portion 738 to form a brine. Operation 802 continues until a water level in the first portion 738 of the reservoir 708 exceeds a height of the weir 744.

As shown in FIG. 27, the salty water or brine passes over the weir 744 from the first portion 738 into the second portion 740 of the reservoir 708. As shown in FIG. 25, once the water level has equalized (e.g., once the water level reaches the water-line of the reservoir 708), the brine in the second portion 740 covers at least a portion of the electrodes 742.

At 804, the electrodes 742 are activated, which triggers electrolysis and the generation of a cleaning solution (e.g., hypochlorite/bleach) within the second portion 740 of the reservoir 708. Operation 804 also produces hydrogen gas, which is vented (operation 806) continuously through the vent 710 and a corresponding hole or opening in the flush tank 20. In some embodiments, the gas may also be allowed to vent through a secondary vent (e.g., exhaust port 726, etc.). According to an exemplary embodiment, the electrodes 742 remain activated throughout the flush cycle. In other embodiments, operation of the electrodes 742 is delayed until a sufficient amount of brine has passed through the weir 744. In yet other embodiments, operation of the electrodes 742 occurs periodically between flushes.

At 808, another flush event is initiated. Water exiting the flush tank 20 is directed toward at least one of a trap way for the toilet 10 or toward the surfaces of a toilet bowl or urinal. As the water level in the flush tank 20 drops, cleaning solution is drawn out from the second portion 740 of the reservoir 708 and into the flush valve 25. Water passing through the flush valve 25 creates a venturi, pulling water out from a second leg of the siphon 712. The venturi activates the siphon 712, which continues until a level of cleaning solution within the second portion 740 drops below the level of the intake port. As the second portion 740 empties, water is injected into the reservoir 708 from the fill valve 35 (e.g., at 802) in preparation for the next flush event.

FIGS. 28-32 conceptually illustrate method 800 for the electro-chlorinating device 502 of the toilet cleaning system 500 of FIGS. 5-16. At 802 (FIG. 28), the reservoir 514 is filled with rising water from the flush tank 20. Water flows into the first portion 538 of the reservoir 514 through the inlet port 544 and mixes with the salt. Simultaneously, water from the flush tank 20 enters the second leg 552 of the siphon 548. During this process, the valve 554 remains open to allow air to exit from the siphon 548. Operation 802 continues until a water level in the first portion 538 of the reservoir 514 is approximately equal to a distance between the lower wall of the housing 512 and a lower edge 535 of the inlet port 544.

As shown in FIG. 29, as the process continues, the salty water or brine diffuses through the membrane 542 into the second portion 540 of the reservoir 514. Depending on the initial water level and size of the flush tank 20, the water level within the first portion 238 of the reservoir 514 may decrease and equalize as the second portion 540 is filled. As shown in FIG. 29, once equalized, the brine in the second portion 540 covers at least a portion of the electrodes 506.

At 804 (FIG. 30), the set of electrodes 506 is activated, triggering electrolysis and the generation of a cleaning solution (e.g., hypochlorite/bleach) within the second portion 540 of the reservoir 514. This operation 804 also generates hydrogen gas, which is vented (at 806) continuously through the exhaust vent 546 and a corresponding vent or opening in the flush tank 20. In some embodiments, the gas may also be allowed to vent through a secondary exhaust vent in either of the access caps 508 and 510.

Figure 32:
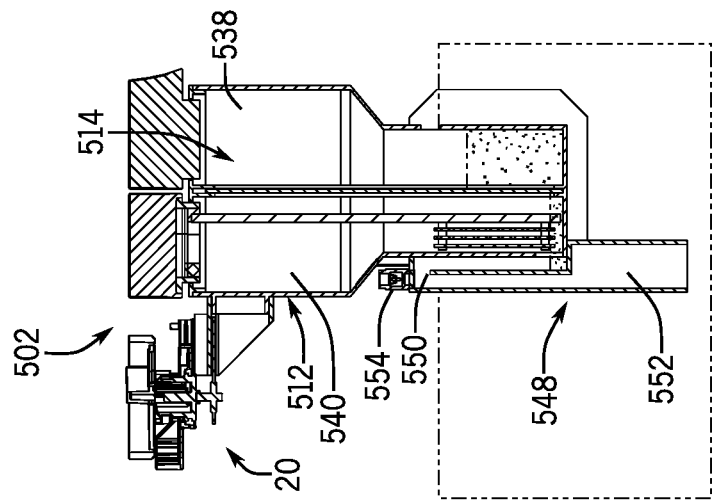
Figure 31:
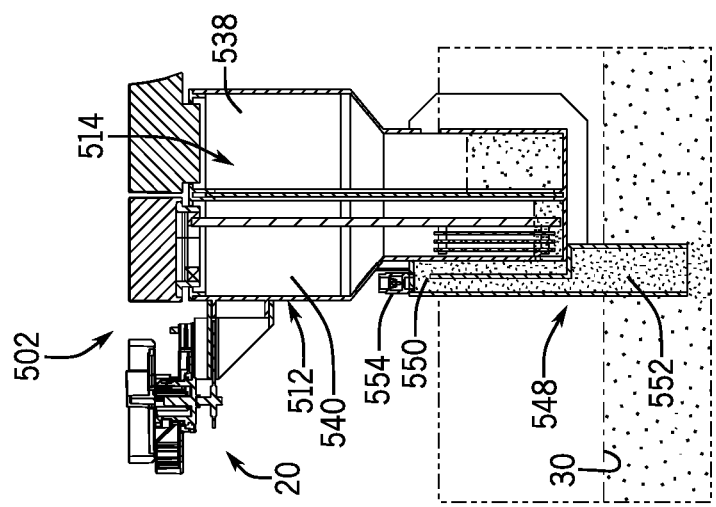

At 808 (FIG. 31), a flush event is initiated. To initiate the flush event, the user may actuate a lever on the toilet 10 or otherwise open a valve (e.g., drain or flush valve) to allow water to escape from the flush tank 20 (see also FIGS. 5-6). Water exiting the flush tank 20 may be directed toward at least one of a trap way for the toilet 10 or the surfaces of a toilet bowl or urinal. As the water level in the flush tank 20 drops, the valve 554 at the top of the siphon 548 closes so as to prevent air from entering the siphon 548. Water leaving through the second leg 552 of the siphon 548 draws the cleaning solution out of the second portion 540 of the reservoir 514 and into the flush tank 20. Operation 808 continues until a level of cleaning solution within the second portion 540 drops below the level of an intake port for the first leg 550. As shown in FIG. 32, once empty, water or brine contained within the first portion 538 is allowed to diffuse into the second portion 540 (e.g., to prefill the second portion 540) in preparation for the next flush event.

Figure 34:
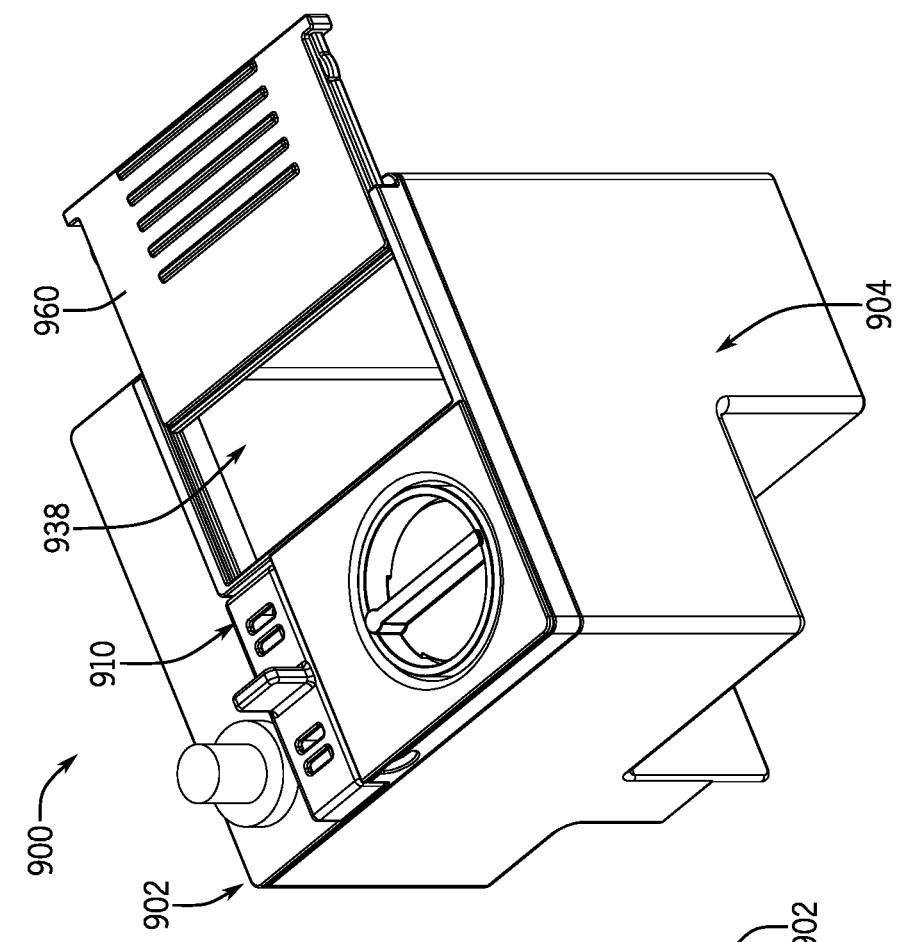
FIG. 34 is a perspective view of the cleaning module of FIG. 33 with an access cover in an open position, according to an exemplary embodiment.
Figure 33:
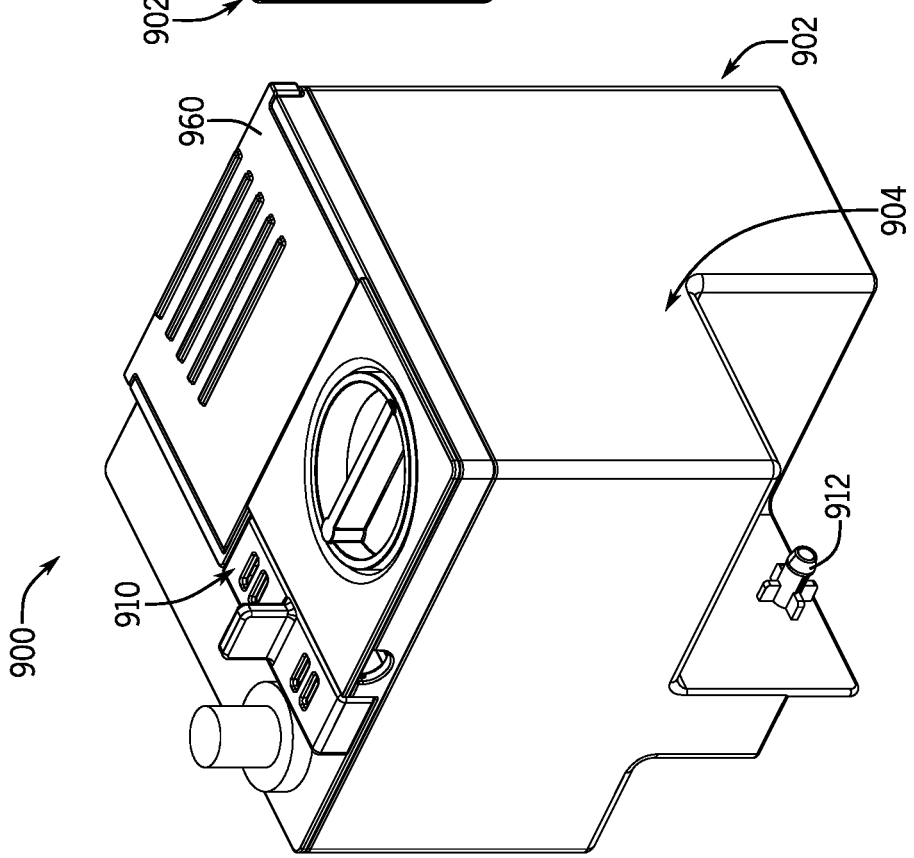
FIG. 33 is a perspective view of a cleaning module for a plumbing product, according to an exemplary embodiment.

It will be appreciated that the electro-chlorinating device may be adapted for use in other plumbing products. Referring now to FIGS. 33-34, a self-contained cleaning system 900 is shown, according to an exemplary embodiment. The cleaning system 900 includes an electro-chlorinating device 902. Similar to the devices 602 and 702 of FIGS. 17-25, the device 902 of FIGS. 33-34 includes a housing 904 configured to isolate the salt and cleaning solution from an environment surrounding the housing 904. As shown in FIG. 34, the housing 904 includes a moveable cover 960 configured to facilitate replenishment of the salt. An outlet port 912 is integrally formed with the housing 904. According to an exemplary embodiment, the outlet port 912 is configured to receive a conduit (e.g., a flow tube, etc.) through which the cleaning solution may be dispensed.

Figure 36:
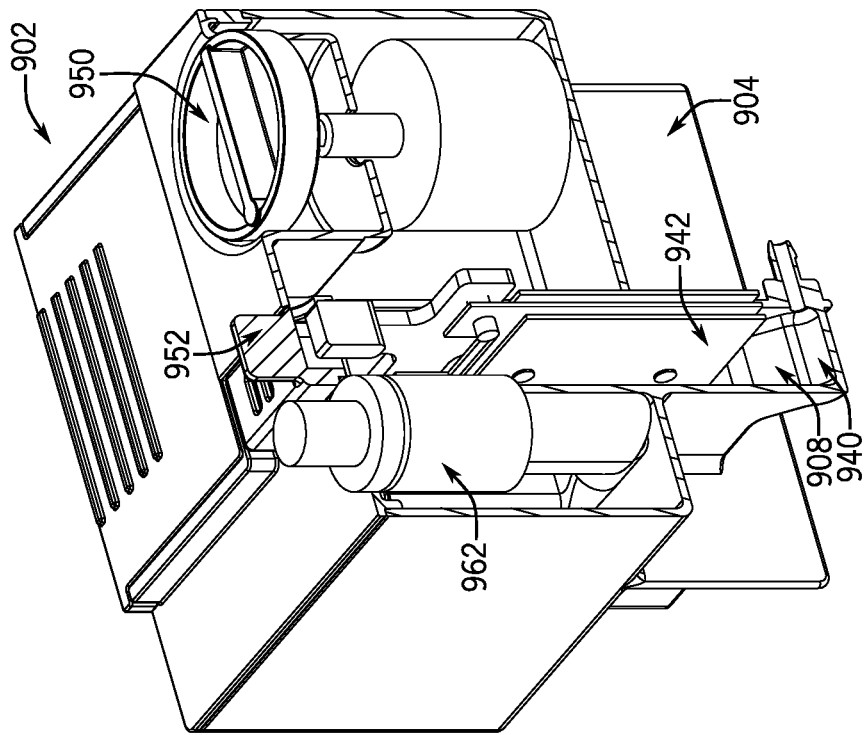
FIG. 36 is another sectional view of the cleaning module of FIG. 33, according to an exemplary embodiment.
Figure 35:
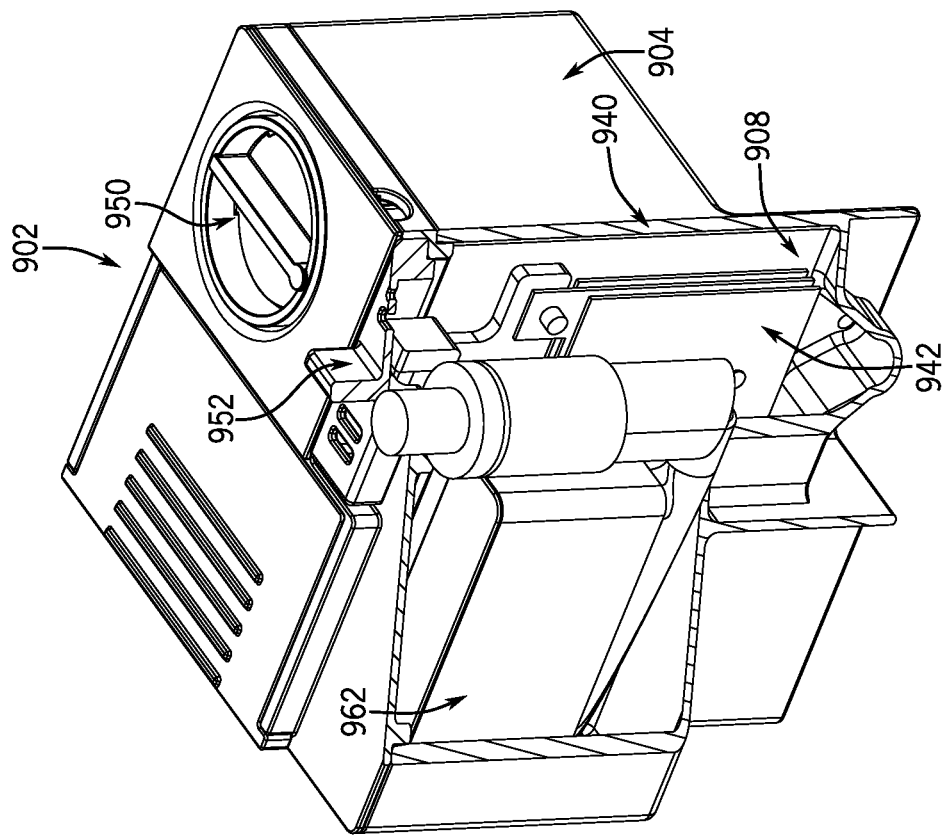
FIG. 35 is a sectional view of the cleaning module of FIG. 33, according to an exemplary embodiment.

FIGS. 35-36 show different cross-sections through the device 902 of FIGS. 33-34. As shown in FIGS. 35-36, the housing 904 defines a reservoir 908. The reservoir 908 is subdivided into two portions, a first portion 938 configured to receive salt (see also FIG. 34), and a second portion 940 configured to receive a pair of electrodes 942. According to an exemplary embodiment, the portions 938 and 940 are separated by a weir, a perforated plate, a partition, or a membrane.

A method of operating the device 902 may be the same or similar to the method 800 of operation described with reference to FIG. 27. As shown in FIGS. 35-36, the device 902 includes a fill valve 962 configured to supply water to at least one of the first and second portions 938 and 940. According to an exemplary embodiment, the fill valve 962 is configured to maintain a water level within at least one of the first and second portions 938 and 940. For example, the fill valve 962 may include a float configured to supply water to the device 902 based on the water level within the device 902. In other embodiments, the fill valve 962 may be manually operated or electronically controlled.

As shown in FIGS. 35-36, the device 902 includes a rheostat 950 to control the voltage and/or current supplied to the electrodes 942. The electrodes 942 are detachably coupled to the housing 904 via an electrode access cap 952. The electrode access cap 952 may be the same or similar to the inner access cap 752 described with reference to FIG. 25. In the exemplary embodiment of FIGS. 33-34, the electrode access cap 952 includes a plurality of slots defining a vent 910 through which hydrogen and other gaseous chemical byproducts may be discharged from the reservoir 908.

The cleaning system 900 may be utilized to facilitate cleaning of a variety of different plumbing products. For example, the cleaning system 900 may be utilized to dispense cleaning solution to a bath tub, sink, hand sprayer, or another plumbing fixture. The device 902 may be disposed in an area beneath the bath tub or sink to conceal the device 902 from a user.

Referring now to FIG. 37, a cleaning system 1000 for a whirlpool bath 1001 is shown, according to an exemplary embodiment. The cleaning system 1000 includes an electro-chlorinating device 1002, which may be the same or similar to the device 902 of FIGS. 33-36. In other embodiments, the electro-chlorinating device 1002 may be different. As shown in FIG. 37, an inlet port of the device 1002 (e.g., an inlet to the fill valve 962, an inlet to one of the first and second portions 938 and 940 of the reservoir 908, etc.) is fluidly coupled to an inlet line of the plumbing product. The inlet line may be a water supply conduit coupled to a building water supply line.

According to an exemplary embodiment, the device 1002 includes a flow control valve 1004 and a venturi 1006. In FIG. 37, the flow control valve 1004 and the venturi 1006 are disposed in an outlet line that extends between the device 602 and a flow passage of the whirlpool bath 1001 (e.g., a jet of the whirlpool bath 1001). In other embodiments, at least one of the flow control valve 1004 and venturi 1006 are coupled to a housing of the device 1002. The flow control valve 1004 is configured to activate or deactivate the cleaning system 1000. As shown in FIG. 37, the flow control valve 1004 is disposed between an outlet of the device 1002 and an inlet to the venturi 1006. In some embodiments, the flow control valve 1004 may be a solenoid valve configured to activate in response to a user's command (e.g., in response to a user pressing a button or another form of actuator). As shown in FIG. 37, inlets to the venturi 1006 are fluidly coupled to the water supply conduit and the outlet. An outlet of the venturi 1006 is fluidly coupled to a jet of the whirlpool bath 1001.

The cleaning system 1000 is configured to utilize the movement of water through the whirlpool bath 1001 to facilitate the release of the cleaning product. According to an exemplary embodiment, the user fills the whirlpool bath 1001 to a desired water level. Once filled, the user activates one or more jets in the whirlpool bath 1001 to circulate water through the bath 1001. In order to dispense the cleaning solution into the bath 1001, the user actuates the flow control valve 1004. Water supplied to the venturi 1006 from the water supply conduit (e.g., due to the activated jet) creates a low pressure region that pulls cleaning solution from the outlet port 1008 of the device 1002. This process continues until the user deactivates the flow control valve 1004. In some embodiments, the cleaning system 1000 is automatically controlled. The system 1000 may include a timer that restricts an amount of cleaning solution that can be dispensed after activating the flow control valve 1004. It will be appreciated that a variety of other control schemes may be utilized for the cleaning system 1000.

Figure 38:
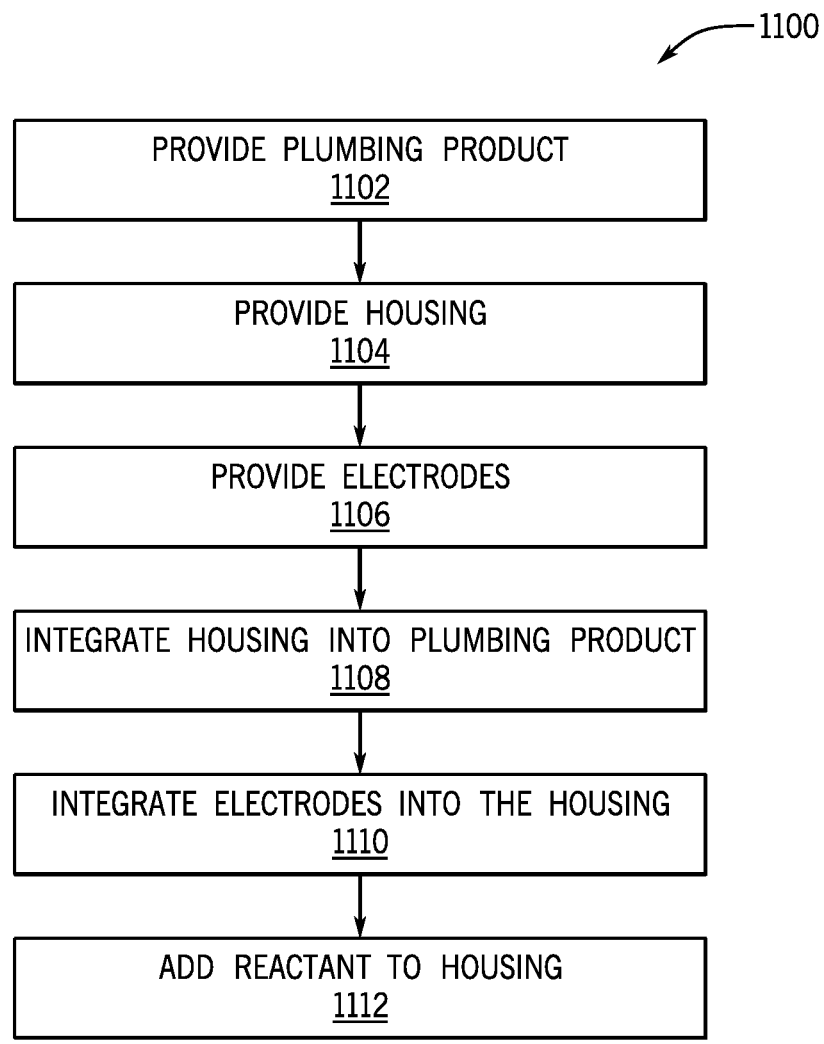
FIG. 38 is a method of making a cleaning system for a plumbing product, according to an exemplary embodiment.

FIG. 38 shows a method 1100 of making a cleaning system, according to an exemplary embodiment. In alternative embodiments, the method 1100 may include additional, fewer, and/or different operations. The method 1100 includes providing a plumbing product, at 1102. The plumbing product may be one of a variety of different plumbing fixtures including, but not limited to, a gravity flush toilet, a urinal, a whirlpool bath, a sink, and a hand sprayer. The method 1100 also includes providing an electro-chlorinating device including a housing, at 1104 and pair of electrodes, at 1106. According to an exemplary embodiment, the housing defines a reservoir, an inlet port, and at least one of a siphon and a venturi. The reservoir is fluidly coupled to the inlet port, the siphon, and the venturi.

As shown in FIG. 38, the method 1100 additionally includes integrating the housing into the plumbing product, at 1108. For example, the operation 1108 may include mounting the housing within a flush tank of a toilet (e.g., a flush tank of the toilet, a flush tank of a urinal, etc.). Operation 1108 may additionally include connecting the inlet port to a water supply conduit (e.g., a fill valve, etc.). The method 1100 may further include connecting the siphon and/or the venturi to the plumbing product (e.g., to a flush valve in a toilet, to a jet for a whirlpool bath, upstream of a hand sprayer nozzle, etc.). The method 1100 may also include coupling the housing to the plumbing product to secure the housing in position relative to the plumbing product, or to conceal the housing.

The method 1100 includes placing the pair of electrodes into a reservoir of the housing, at 1110. As with the toilet cleaning systems 700 described with reference to FIGS. 23-25, the electrodes 742 may be provided as part of an electrode cartridge 757 that is received within a second portion 740 of the reservoir 708. The electrodes 742 are inserted into the reservoir 708 by inserting the inner access cap 752 into an opening at the top of the second portion 740 of the reservoir. As shown in FIG. 38 (see also FIGS. 23-25), the method 1100 includes adding a reactant (e.g., salt), at 1112 to the first portion 738 of the reservoir 708. For example, the method 1100 may include unlocking and removing an outer access cap 754, pouring salt into the first portion 738 through an opening at the top of the first portion 738, replacing the outer access cap 754 in position in the opening, and locking the outer access cap 754 to prevent inadvertent removal.

The cleaning system of which various exemplary embodiments are disclosed herein, provides several advantages over conventional devices. Unlike conventional chemical-based cleaning products, the cleaning system includes an electro-chlorinating device including electrodes that are configured to generate a cleaning solution in-situ through the process of electrolysis. Among other benefits, the electro-chlorinating device is a self-contained unit that may be retrofit into an existing plumbing product (e.g., a gravity-fed toilet or urinal, a whirlpool bath, a hand sprayer for a sink or shower, etc.). The electro-chlorinating device utilizes non-toxic reactants that are readily available, thereby eliminating the need for a user to handle or otherwise interact with chemical-based pucks and cleaning tablets. Additionally, as a result of the low cost of the reactants and the electricity required to power the electrodes, the cost of operating the electro-chlorinating device may be significantly less than alternative cleaning products (e.g., chemical pucks and tablets). Furthermore, the cleaning system is configured to utilize the movement of water through the plumbing product to facilitate the release of the cleaning product, which can, advantageously, minimize exposure of the cleaning solution to delicate components within the plumbing product, and improve overall distribution of the cleaning solution along surfaces of the toilet bowl.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present application. For example, any element disclosed in one embodiment may be incorporated or utilized with any other embodiment disclosed herein.

What is claimed is:

1. An electro-chlorinating device, comprising:
    a housing, comprising:
        a reservoir;
        an inlet port fluidly coupled to the reservoir;
        a pair of electrodes coupled to the housing such that at least a portion of each electrode of the pair of electrodes is disposed within the reservoir; and
        a discharge device fluidly coupled to the reservoir, the discharge device configured to be fluidly coupled to a flush tank, the discharge device configured to release a fluid surrounding the pair of electrodes into the flush tank toward a bottom of wall of the flush tank through a leg to a release port at an entrance to a flush valve of the flush tank in response to a movement of water through the flush valve of the flush tank, wherein the discharge device comprises at least one of a siphon or a venturi in response to the movement of water through the flush valve of the flush tank.

2. The electro-chlorinating device of claim 1, wherein the reservoir is subdivided into a first portion and a second portion, wherein the first portion is fluidly coupled to the inlet port and the second portion is fluidly coupled to the first portion and the discharge device, and wherein the pair of electrodes are at least partially disposed within the second portion.

3. The electro-chlorinating device of claim 2, wherein the first portion is a salt tank configured to receive a salt, and wherein the housing includes at least one of a permeable barrier or a weir that at least partially separates the first portion from the second portion.

4. The electro-chlorinating device of claim 2, further comprising an exhaust port that fluidly couples the second portion with an environment surrounding the electro-chlorinating device.

5. The electro-chlorinating device of claim 1, wherein the siphon comprises an inverted U-shaped channel, wherein the siphon is configured to be fluidly coupled to the flush tank of a toilet.

6. The electro-chlorinating device of claim 5, wherein the inverted U-shaped channel comprises:
a first leg disposed in the reservoir and extending along a side of the housing toward a lower wall of the housing; and
wherein the leg is a second leg disposed on an outer surface of the housing and extending beyond the lower wall of the housing and toward a bottom wall of the flush tank, and
wherein the water leaving the siphon through the second leg draws the fluid up through the first leg and into the second leg, triggering a siphon effect.

7. The electro-chlorinating device of claim 5, wherein the inverted U-shaped channel comprises a first leg fluidly coupled to the reservoir and a second leg fluidly coupled to the first leg,
wherein the electro-chlorinating device further comprises a check valve disposed at an intersection between the first leg and the second leg, and
wherein the check valve is configured to prevent air from being pulled into the siphon at beginning of a flushing event and to allow air to exit from the siphon during a period when the flush tank is being refilled.

8. The electro-chlorinating device of claim 5, wherein the inverted U-shaped channel comprises:
a first leg fluidly coupled to the reservoir and extending upward from a lower wall of the housing; and
wherein the leg is a second leg extending downward from an upper portion of the first leg, and
wherein when the flush valve is activated, the water leaving the siphon through the second leg draws the fluid up through the first leg and into the second leg, triggering a siphon effect.

9. The electro-chlorinating device of claim 1, wherein the discharge device comprises:
a chemical passage fluidly coupled to the siphon; and
the flush valve fluidly coupled to the chemical passage opposite the siphon, wherein the flush valve is configured to fluidly couple the flush tank of a toilet to a bowl of the toilet.

10. The electro-chlorinating device of claim 9, wherein the chemical passage is fluidly coupled to an opening along a converging portion of the flush valve.

11. The electro-chlorinating device of claim 9, wherein the chemical passage is fluidly coupled to an opening along a converging portion, having a decreasing cross-sectional area in a flow direction, of the flush valve,
wherein when the flush valve is activated, the water passing through the flush valve creates a venturi that pulls the fluid out of the reservoir through the siphon.

12. The electro-chlorinating device of claim 1, further comprising an electrode cartridge comprising an access cap and a support member connected to the access cap, wherein the access cap is detachably coupled to the housing, and wherein the pair of electrodes is mounted to the support member.

13. The electro-chlorinating device of claim 1, wherein the pair of electrodes comprises a first electrode and a second electrode oriented substantially parallel to the first electrode and spaced apart from the first electrode to form a gap, and wherein at least a portion of the pair of electrodes is positioned below a water-line of the reservoir.

14. A system, comprising:
a toilet comprising:
a bowl;
a flush tank that is fluidly coupled to the bowl;
a flush valve; and
an electro-chlorinating device, comprising:
a housing coupled to the flush tank and disposed at least partially within the flush tank, the housing comprising:
a reservoir spaced apart from the flush valve;
an inlet port fluidly coupled to the reservoir;
a pair of electrodes coupled to the housing such that at least a portion of each electrode of the pair of electrodes is disposed within the reservoir; and
a discharge device fluidly coupled to the reservoir and the flush tank, the discharge device configured to release a fluid surrounding the pair of electrodes into a bottom of the flush tank into a bottom of the flush tank through a leg to a release port at an entrance to the flush an entrance to the flush valve of the toilet in response to a movement of water through the flush valve of the toilet, wherein the discharge device comprises at least one of a siphon or a venturi in response to the movement of water through the flush valve of the flush tank.

15. The system of claim 14, wherein the reservoir is subdivided into a first portion and a second portion, wherein the first portion is fluidly coupled to the inlet port and the second portion is fluidly coupled to the first portion and the discharge device, and wherein the pair of electrodes are at least partially disposed within the second portion.

16. The electro-chlorinating device of claim 15, wherein the first portion is a salt tank configured to receive a salt, and wherein the housing includes at least one of a permeable barrier or a weir that at least partially separates the first portion from the second portion.

17. The system of claim 14, wherein the siphon comprises an inverted U-shaped channel, wherein the siphon is fluidly coupled to the flush valve of the toilet that fluidly couples the flush tank to the bowl.

18. The system of claim 14, wherein the electro-chlorinating device further comprises:
a chemical passage fluidly coupled to the siphon; and the flush valve fluidly coupled to the chemical passage opposite the siphon, wherein the flush valve fluidly couples the flush tank to the bowl.

19. The system of claim 18, wherein the chemical passage is fluidly coupled to an opening along a converging portion of the flush valve.

20. The electro-chlorinating device of claim 14, further comprising an electrode cartridge comprising an access cap and a support member connected to the access cap, wherein the access cap is detachably coupled to the housing, and wherein the pair of electrodes is mounted to the support member.

21. A flush tank for a toilet, comprising:
a housing coupled to the flush tank and disposed at least partially within the flush tank, the housing comprising:
  a reservoir;
  an inlet port fluidly coupled to the reservoir;
  a pair of electrodes coupled to the housing such that at least a portion of each electrode of the pair of electrodes is disposed within the reservoir; and
  a discharge device fluidly coupled to the reservoir and the flush tank, the discharge device configured to release a fluid surrounding the pair of electrodes into a bottom of the flush tank through a leg to a release port at an entrance to a flush valve of the toilet in response to a movement of water through the flush valve of the toilet, wherein the discharge device comprises at least one of a siphon or a venturi in response to the movement of water through the flush valve of the flush tank.

* * * * *

UNITED STATES PATENT AND TRADEMARK OFFICE
CERTIFICATE OF CORRECTION

PATENT NO. : 12,134,885 B2
APPLICATION NO. : 16/743096
DATED : November 5, 2024
INVENTOR(S) : Clayton C Garrels et al.

Page 1 of 1

It is certified that error appears in the above-identified patent and that said Letters Patent is hereby corrected as shown below:

In the Claims

Column 24:
At Line 44 (Claim 14), "entrance to the flush an entrance to the flush valve" should be replaced with --entrance to the flush valve--

Signed and Sealed this
Twenty-fifth Day of November, 2025

John A. Squires
*Director of the United States Patent and Trademark Office*